United States Patent Office
3,737,547
Patented June 5, 1973

3,737,547
ANTIPARASITIC COMPOSITION CONTAINING NITROIMIDAZOLE DERIVATIVES USEFUL IN THE TREATMENT OF POULTRY
John A. Carlson, Nassau, N.Y., Dale R. Hoff, Basking Ridge, N.J., and Clarence S. Rooney, Beaconsfield, Quebec, Canada, assignors to Merck & Co., Inc., Rahway, N.J.
No Drawing. Application Sept. 5, 1960, Ser. No. 855,765, which is a continuation-in-part of abandoned application Ser. No. 550,932, May 18, 1966, which in turn is a continuation-in-part of abandoned application Ser. No. 470,239, July 7, 1965. Divided and this application Nov. 12, 1971, Ser. No. 198,417
Int. Cl. A61k 27/00
U.S. Cl. 424—273     6 Claims

ABSTRACT OF THE DISCLOSURE

Antiparasitic compositions containing as the active ingredient, 1 - substituted - 5-nitroimidazol-2-yl-alkyl carbamates and acid addition salts thereof are provided. The compounds are prepared from 1-substituted - 5 - nitroimidazoles having at the 2-position of the imidazole ring an hydroxyalkyl, mercaptoalkyl, alkylsulfonyloxyalkyl, alkarylsulfonyloxyalkyl, haloalkyl, halocarbonylalkyl or halothiocarbonyloxyalkyl radical. The compositions are useful against enterohepatitis and PPLO infections, and are primarily valuable against diseases of the domestic fowl. Poultry feed compositions containing the active compounds are also provided.

CROSS REFERENCE TO RELATED APPLICATIONS

This is a divisional application of copending application U.S. Ser. No. 855,765 filed Sept. 5, 1960, now U.S. Pat. 3,646,027, which was a continuation-in-part application of copending application U.S. Ser. No. 550,932 filed May 18, 1966, now abandoned, which, in turn, was a continuation-in-part of application U.S. Ser. No, 470,239 filed July 7, 1965 and now abandoned.

DESCRIPTION OF THE PREFERRED EMBODIMENTS

This invention relates to new chemical compounds and compositions containing the same. More particularly, it relates to novel imidazole carbamates. It is concerned further with chemical synthesis of such substances and with novel imidazole compounds useful as intermediates in such synthesis. In addition, it is concerned with antiparasitic compositions containing the imidazole carbamates of this invention as active ingredients.

One object of this invention is to provide new and useful 1 - substituted-imidazol-2-ylalkyl carbamates, N-substituted carbamates and acid addition salts thereof. It is also an object to provide 1-substituted-5-nitroimidazol-2-ylalkyl N-substituted carbamates which have antiparasitic activity. Another object is to provide methods for making these compounds from 1-substituted-5-nitroimidazoles having at the 2-position of the imidazole ring, a hydroxyalkyl, mercaptoalkyl, alkylsulfonyloxyalkyl, alkarylsulfonyloxyalkyl, haloalkyl, halocarbonyloxyalkyl, or halothiocarbonyloxyalkyl radical.

A further object is to provide compositions useful against parasitic diseases, for example, trichomoniasis, enterohepatitis and as antihelminthic compositions against ascarids and schistosomes. Certain of them are also effective against amoebiasis and trypanosomiasis as well as chronic respiratory diseases in fowl and swine caused by PPLO organisms. Certain of the compositions of the present invention also show antibacterial activity. In these compositions, 1-substituted-5-nitroimidazol-2-ylalkyl carbamates are present as active ingredients.

A further object is to provide novel chemical compounds which are intermediates in the synthesis of 1-substituted-5-nitroimidazol-2-yl alkyl carbamates and which in some instances have antitrichomonal and other antiparasitic activity. Other objects will become clear from the following detailed description of the invention.

The novel imidazole carbamates of this invention may be represented by the following structural formulae:

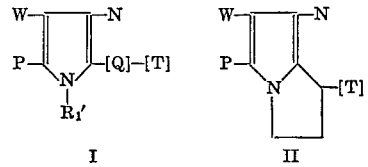

wherein $R_1'$ is $R_1$ or hydroxyalkyl and $R_1$ is alkyl, suitably loweralkyl, such as, methyl, ethyl, propyl, butyl or pentyl, or the substituted derivatives thereof. The substituent groups on the alkyl group may be aryl or substituted aryl, such as phenyl, fluorophenyl or nitrophenyl; oxo; alkenyl such as ethenyl, propenyl and butenyl and hydroxy; alkanoyloxy, suitably loweralkanoyloxy, for example, acetoxy, propionoxy, butyryloxy, or valeryloxy; benzoyloxy; alkoxy, suitably loweralkoxy, such as methoxy, propoxy, or butoxy; aralkoxy, such as phenylloweralkoxy, suitably, benzyloxy; carboxy; carboalkoxy, such as, carboloweralkoxy, preferably, carbomethoxy, carboethoxy and carbopropoxy; carbamoyl and N-substituted carbamoyl, wherein the N-substituents are alkyl, aralkyl and aryl, suitably loweralkyl, such as, methyl, propyl, butyl and pentyl, phenylloweralkyl, such as benzyl and phenyl; cyano; substituted thio, substituted sulfinyl and substituted sulfonyl, wherein the substituent groups are alkyl, aralkyl, and aryl, suitably loweralkyl, such as ethyl, propyl and butyl, phenylloweralkyl, such as benzyl or phenyl, and carbamoyloxy.

W represents nitro, cyano, phenyl or hydrogen and P represents hydrogen or nitro, provided that only one of the groups W and P is nitro at any one time.

Q is selected from the group consisting of alkylene, such as, loweralkylene suitably methylene, propylene, butylene and ethylene; alkylidene such as loweralkylidene suitably ethylidene, propylidene and butylidene; propenylene and aralkylidene suitably phenylloweralkylidene, for example phenylmethylene.

T is selected from the group consisting of carbamoyloxy, carbamoylthio, thioncarbamoyloxy, thiocarbamoylthio, pseudo-ureido, pseudo-thioureido, and the N-substituted and N,N-disubstituted derivatives thereof. The group T may be represented by the substructure

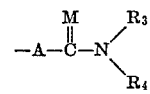

M is oxygen, sulfur, imino or alkylimino.
A is oxygen or sulfur.
The N-substituents of the group T designated as $R_3$ and $R_4$ include the following:

hydrogen;
alkyl, suitably loweralkyl, such as, methyl, ethyl, propyl or butyl, or substituted alkyl, wherein the substituents of the alkyl group may be:
  hydroxy;
  (halohydroxy) or (polyhalohydroxy), such as (trichlorohydroxy), (trifluorohydroxy) and tribromohydroxy); alkoxy, suitably loweralkoxy, such as methoxy, propoxy, or butoxy; oxo; (aryl, oxo), such as (phenyloxo); carboxy; carboalkoxy; suitably carboloweralkoxy such as, carbomethoxy, carboethoxy and carbopropoxy; carboaralkoxy, such as, carbophenylloweralkoxy, suitably carbophenylacetoxy; carbamoyl; alkanoyloxy such as, loweralkanoyloxy, suitably acetoxy, propionoxy or butyroxy; aralkanoyloxy, for example, phenylloweralkanoyloxy, such as, benzoyloxy; carbamoyl, or sulfamoyl and the N-substituted derivatives thereof wherein the N-substituents may be:

N-alkyl, suitably N-loweralkyl, such as, N-methyl, N-propyl, N-pentyl, N-aryl, such as N-phenyl or N-aralkyl such as N-phenylloweralkyl, such as N-benzyl;

mercapto and substituted mercapto wherein the substituents may be:

alkyl, such as, loweralkyl, for example, methyl, ethyl, and propyl and aralkyl, suitably phenylloweralkyl, such as benzyl;

thioncarbamoyl; substituted thiocarbamoylthio, wherein the substitutents may be:

N,N-dialkyl, such as N,N-dimethyl, N,N-diethyl, N,N-dipropyl, N,N-diaralkyl, such as N,N-di(phenylloweralkyl), suitably N,N-dibenzyl;

amino; or substituted amino, wherein the substituents may be:

alkyl, suitably diloweralkyl, such as dimethyl, dibutyl, dipentyl or diaralkyl, such as di(phenylloweralkyl), suitably dibenzyl;

heterocycloalkyl, wherein the ring contains at least one nitrogen atom, bonded to the alkyl group, suitably a 4- or 5-membered saturated heterocycloalkyl, for example, morpholino, thiamorpholino, piperidino, piperazino, 4-methyl-piperazino, imidazolidino, and pyrrolidino;

phenyl, and substituted phenyl such as nitrophenyl, chlorophenyl or fluorophenyl;

substituted alkylidene, wherein suitable substituents may be:

alkoxy, preferably loweralkoxy, such as, methoxy, butoxy and pentoxy; aralkoxy, suitably phenyloweralkoxy such as, benzoxy and aroxy, for example, phenoxy, substituted amino, wherein the substituents may be dialkyl, such as, diloweralkyl, such as, dimethyl, dipropyl or dipentyl; diaralkyl, for example di(phenylloweralkyl), suitably dibenzyl;

substituted alkenylene wherein suitable substituents may be (carboalkoxy, alkyl) such as (carboloweralkoxy, loweralkyl), suitably (carbomethoxy, methyl);

N,N-dialkylformiminium halide wherein the alkyl groups may be loweralkyl, such as, methyl, ethyl or propyl;

acyl, for example, alkanoyl, suitably loweralkanoyl, such as, formyl, acetyl, propionyl, butyryl, or valeryl; aralkanoyl, suitably phenylloweralkanoyl, such as phenylacetyl;

cyanoalkenoyl, suitably cyanoloweralkanoyl, such as cyanoacetyl or cyanopropionyl; alkenoyl, suitably loweralkenoyl, such as acryloyl or crotonoyl; and aroyl, such as benzoyl;

hydroxy and substituted hydroxy, wherein the substituents are acyl, such as alkanoyl, suitably lower alkanoyl, such as, formyl, acetyl, propionyl, butyryl, or valeryl, aralkanoyl, suitably phenylloweralkanoyl, such as, phenylacetyl; cyanoalkanoyl, suitably cyanoloweralkanoyl, such as cyanoacetyl or cyanopropionyl; alkenyl, suitably loweralkenoyl, such as acryloyl or crotonoyl; and aroyl, such as benzoyl;

alkyl, suitably loweralkyl, for example, methyl, ethyl, butyl and pentyl; aralkyl, such as, phenylloweralkyl, suitably benzyl and aryl, for example, phenyl;

carbamoyl and N-substituted carbamoyl wherein the substituents may be alkyl, suitably loweralkyl, for example, methyl, ethyl, butyl and pentyl; aralkyl, such as phenylloweralkyl, suitably benzyl and aryl, for example, phenyl;

thiocarbamoyl and substituted thiocarbamoyl, wherein the preferred substituents are alkyl, suitably loweralkyl, for example, methyl, ethyl, butyl and pentyl; aralkyl, such as phenylloweralkyl, suitably benzyl and aryl, for example, phenyl;

heterocycloalkylcarbonyl, wherein the heterocycloalkyl ring contains at least one nitrogen atom bonded to the carbonyl group, suitably a 6- or 5-membered saturated heterocycloalkyl, for example, morpholino, thiamorpholino, piperidino, piperazino, 4-methylpiperazino and pyrrolidino;

nitro;

amino and substituted amino, wherein the preferred substituents are carbamoyl and thiocarbamoyl; alkylidene, such as, loweralkylidene, isopropylidene, 2-butylidene, 3-pentylidene, and ethylidene; aralkylidene, for example, phenylloweralkylidene, such as benzylidene; acyl, for example, alkanoyl, suitably loweralkanoyl, such as, formyl, acetyl, propionyl, butyryl, or valeryl; aralkanoyl, suitably phenylloweralkanoyl, such as phenylbutyryl;

cyanoalkanoyl, suitably cyanoloweralkanoyl, such as cyanoacetyl or cyanopropionyl; alkenoyl, suitably loweralkenoyl, such as, acryloyl or crotonoyl; and aroyl, such as benzoyl;

sulfamoyl and diaminophosphoryl and the N-substituents thereof, wherein the preferred substituents are alkyl, suitably loweralkyl, such as methyl, ethyl, propyl and butyl; and aralkyl, suitably phenylloweralkyl, such as benzyl, also within the scope of the present invention are those compounds where T has the substructure

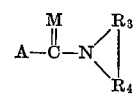

wherein A is oxygen or sulfur, M is oxygen, sulfur, imino or substituted imino and $R_3$ and $R_4$ together represent the group $—(CH_2)_2R_5—(CH_2)_2—$, where $R_5$ is oxygen, sulfur, $—CH_2—$ or $N—R_6$, and $R_6$ is hydrogen or loweralkyl, for example taken together with the N-atom to which $R_3$ and $R_4$ are attached, they represent morpholino, thiomorpholino, piperidino, 4-methylpiperazino or pyrrolino. Furthermore, within the scope of the present invention are those compounds wherein T has the substructure

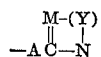

wherein A is oxygen or sulfur, M is $>N—$ and Y is alkylene suitably ethylene or propylene wherein the group

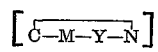

constitutes a nitrogenous heterocycloalkyl group.

Also within the purview of the invention are acid addition salts of these imidazole carbamates. The salt may be of an inorganic acid such as the hydrochloride, hydrobromide, phosphate, nitrate or sulfate, or of an organic acid, examples of which are the citrate, tartrate, adipate, methanesulfonate, p-toluenesulfonate and the like. Non-toxic acid addition salts, i.e., those tolerated by the host at the dose levels employed, are employed when the carbamates are to be used in their salt form as antiparasitic agents.

The preferred compounds of this invention are the 1-substituted-5-nitroimidazol-2-ylalkyl carbamates and substituted carbamates. More specifically, the preferred compounds are the imidazolylalkyl carbamates of the invention as shown in Formula I on page 2 supra, wherein W is hydrogen, P is nitro, Q is loweralkylene suitably methylene or ethylene, or loweralkylidene suitably 1-ethylidene, $R_1$ is alkyl or hydroxyalkyl such as methyl, ethyl or 2-hydroxyethyl and T is represented by the sub-group

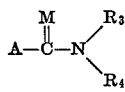

wherein A is oxygen or sulfur, M is oxygen or sulfur and $R_3$ and $R_4$ are each hydrogen, loweralkyl, hydroxy or loweralkanoyl, and $R_3$, $R_4$ and N taken together are heterocycloalkyl. These preferred embodiments will be discussed at more length than others in the description of the invention. The following explanations of processes apply to most substances embraced by the generic Formulae I and II. However, it should be understood that these processes do not constitute the preferred processes for certain N-substituted carbamates. The preferred processes for this latter class of N-substituted carbamates will be discussed below following the discussion of the principal processes.

In accordance with the present invention, there are provided chemical syntheses of these novel imidazolylalkyl carbamates.

THE GENERAL PROCESSES (1) The isocyanate and isothiocyanate procedure

One method for making the carbamates is by the reaction of an appropriate isocyanate or isothiocyanate with a 1-substituted - 2 - hydroxyalkyl - 5 - nitroimidazole or 1-substituted-2-mercaptoalkyl-5-nitroimidazole:

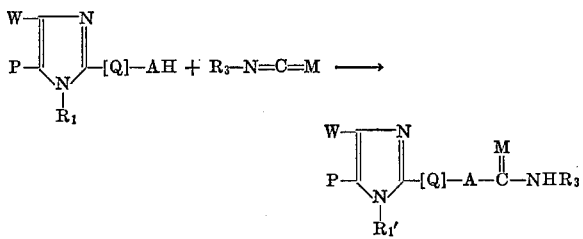

wherein W, P, Q, A, M, $R_1$, $R_1'$ and $R_3$ are as above.

In the preferred modification of this process, the significance of the substituents is as follows:

W is hydrogen;
P is nitro;
Q is loweralkylene suitably methylene or ethylene; or lower alkylidene suitably ethylidene;
$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;
A and M each represent oxygen or sulfur;
$R_3$ represents hydrogen, alkyl, suitably loweralkyl, such as methyl, ethyl or propyl; aryl, such as phenyl; aralkyl, suitably arylloweralkyl, such as benzyl; alkoxyalkyl, suitably loweralkoxyloweralkyl, such as ethoxyethyl or ethoxypropyl; haloalkyl suitably halolower alkyl, such as chloroethyl, bromoethyl, or trifluoropropyl; substituted sulfonyl, for example halosulfonyl, such chlorosulfonyl or bromosulfonyl or loweralkyl or arylsulfonyl, such as methanesufonyl or p-toluenesulfonyl; dihalophosphoryl suitably dichlorophosphoryl; and acyl suitably loweralkanoyl, such as acetyl, propionyl or butyryl, or aroyl such as benzoyl.

When it is desired to prepare the 1-hydroxyalkyl imidazolylalkyl carbamates according to this and the other processes described herein, it is necessary to "block" this 1-substituent during the reaction involving the 2-hydroxyalkyl or 2-mercaptoalkyl radical of the imidazole, or else the free hydroxy group will react with the isocyanate or isothiocyanate. This "blocking" is conveniently accomplished by esterifying, i.e., by employing a 1-acyloxyalkyl imidazole as starting material, an ester of a loweralkanoic acid or benzoic acid, for example, an ester of acetic acid, propionic acid or benzoic acid, is conveniently employed, for example, the starting material may be 1-(2-acetoxyethyl)-2-hydroxymethyl-5-nitroimidazole, 1-(2-propionoxypropyl) - 2 - mercaptomethyl-5-nitroimidazole or 1-(2-benzoyloxyethyl)-2-(1-hydroxyethyl)-5-nitroimidazole.

This esterified radical normally survives the isocyanate reaction unchanged under the preferred process conditions, and the resulting 1-acyloxyalkylimidazole carbamate may then be hydrolyzed with base to the corresponding 1-hydroxyalkyl carbamate.

Where $R_3$ is halosulfonyl or dihalophosphoryl, the carbamate produced in accordance with this process may be readily converted to the corresponding N-sulfamoyl carbamate or N-diaminophosphoryl carbamate by reaction with ammonia suitably liquid ammonia. If desired, the corresponding N-(N'-substituted sulfamoyl)carbamates or N-(N'-substituted diaminophosphoryl)carbamates may be obtained by utilizing a suitable substituted amine in place of ammonia.

The isocyanate reaction of the above flow diagram is conveniently brought about by contacting the imidazole and substituted isocyanate (or isothiocyanate) reactants, preferably in equimolar amounts or with a slight molar excess of isocyanate (or isothiocyanate), in an inert solvent medium at a temperature of between about 20–120° C. Aromatic hydrocarbons such as benzene and toluene, or halogenated aliphatic hydrocarbons, e.g., dichloro- or tetrachloroethane are examples of suitable solvents. It is desirable to have present a minor amount of base such as a tertiary amine, e.g., pyridine or triethylamine, or even stronger bases such as alkali metal alkoxides, such as sodium methoxide or potassium ethoxide, since the reaction is base catalyzed.

Examples of imidazolylalkyl carbamates which may be obtained in this manner from the appropriate nitroimidazole are 1-methyl-5-nitroimidazol-2-ylmethyl benzoylcarbamate,
1-methyl-5-nitroimidazol-2-ylmethyl acetylcarbamate,
1-(2'-acetoxyethyl)-5-nitroimidazol-2-ylmethyl ethylcrabamate,
1-(1'-ethyl-5'-nitroimidazol-2'-yl)ethyl methylcarbamate,
1-propyl-5-nitroimidazol-2-ylmethyl 4-morpholinocarboxylate,
1-methyl-5-nitroimidazol-2-ylmethyl methylthiolcarbamate and
1-(2'-acetoxypropyl)-5-nitroimidazol-2-ylmethyl phenylthioncarbamate.

The method may also be used for making carbamates where $R_3$ is hydrogen and M is oxygen, in which case the cyanic acid reactant is preferably generated in situ from an alkali metal cyanate, as by addition of acetic or trifluoroacetic acid to the reaction mixture. It might be mentioned, however, that other methods described herein are generally more satisfactory for making the unsubstituted carbamates, and further that this particular process is not suitable for preparing the unsubstituted thioncarbamates where $R_3$ in the formula is hydrogen and M is sulfur.

(ii) Alkali metal cyanate or thiocyanate/acid procedure

Certain of the 1-substituted imidazol-2-ylalkyl carbamates and thiocarbamates of this invention may be obtained by another process which comprises the reaction of the corresponding 1-substituted-2-halomethyl (or 2-alkyl or arylsulfonyloxymethyl) imidazolyl with an alkali metal cyanate or thiocyanate to produce a 1-substituted-2-cyanatomethyl or 2-thiocyanatomethylimidazole and treatment of said compound with a mineral acid, preferably sulfuric acid. It is preferred, however, to use this method for the preparation of thiocarbamates rather than carbamates due to the possibility of rearrangement of the cyanato intermediate to an isocyanato derivative. This problem is not of practical importance where the thiocyanato intermediate is concerned. The reaction may be schematically represented as follows:

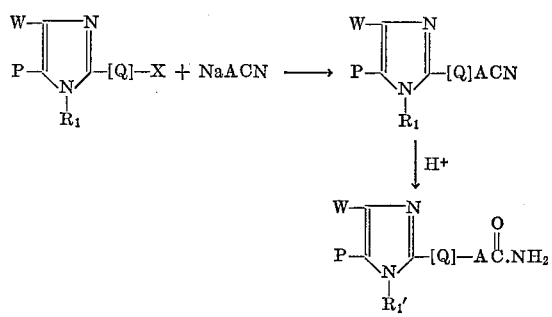

wherein W, P, $R_1$, $R_1'$ and Q are as above; and X is halo or substituted sulfonyloxy.

In the preferred modifications of this process, the significance of the substituents is as follows:

W is hydrogen;

P is nitro;

Q is loweralkylene suitably methylene or ethylene; or loweralkylidene suitably ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ or $R_1$ is hydroxyalkyl such as hydroxyethyl or hydroxypropyl;

A and M each represent oxygen or sulfur; and

X is chloro, mesyl or tosyl, or bromo.

It is preferred to affect the reaction with thiocyanate in a solvent medium such as loweralkanol, for example, methanol or ethanol, dimethylformamide, lower-alkanoylnitrile, such as acetonitrile and the like, at a temperature of between about 15° C. and about 100° C. The immediate product is a 1-substituted -2-thiocyano-5-nitroimidazole, for example, a 1-alkyl or 1-acyloxyloweralkyl-2-thiocyano-5-nitroimidazole, such as, a 1-methyl, 1-ethyl, or 1-acetoxyethyl 2-thiocyano-5-nitroimidazole. A similar product is obtained when there is employed, as starting material, a 2-alkylsulfonyloxymethyl or 2-arylsulfonyloxymethyl imidazole, such as 2-methylsulfonyloxymethyl or 2-p-toluenesulfonyloxymethyl-5-nitroimidazole instead of the 2-halomethyl imidazole, such as the corresponding 2-chloro or 2-bromomethyl-5-nitroimidazole.

Conversion of the 1-substituted-2-thiocyanoalkyl or 2-cyanoalkyl-5-nitroimidazole to the thio carbamate or carbamate is conveniently accomplished by contacting it with an excess of strong acid, preferably concentrated sulfuric acid in the cold, for example, at between 0° and 15° C. The reaction is then quenched in water to precipitate the thiolcarbamate. In those cases where the 1-substituent is acyloxyalkyl, this ester is hydrolyzed to the corresponding 1-hydroxyalkyl radical during the sulfuric acid reaction. Examples of compounds prepared in accordance with this procedure include: 1-methyl-5-nitroimidazol - 2 - ylmethyl thiolcarbamate, 1-ethyl-5-nitroimidazol-2-ylmethyl thiolcarbamate and 1-methyl-5-nitroimidazol-2-ylethyl thiolcarbamate.

(iii) The imidazole halocarbonate process

Still another process for making the carbamates of this invention consists in reaction of the halocarbonate or halothioncarbonate ester of 1-substituted-2-hydroxyalkyl (or 2-mercaptoalkyl)-5-nitroimidazole with a primary or secondary amine. The reaction may be schematically represented as follows:

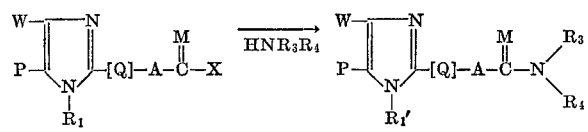

wherein W, P, Q, A, M, $R_1$, $R_1'$, $R_3$ and $R_4$ are as above, and X is halo.

In the preferred modification of this process, the significance of the substituents is as follows:

W is hydrogen;

P is nitro;

Q is loweralkylene suitably methylene or ethylene; or loweralkylidene suitably ethylidene;

$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;

A and M each represent oxygen or sulfur;

X is chloro;

$R_3$ and $R_4$ individually represent hydrogen; alkyl, suitably loweralkyl, such as methyl, ethyl or propyl; aryl, such as phenyl; aralkyl, suitably arylloweralkyl, such as benzyl, hydroxyalkyl, suitably hydroxyloweralkyl, such as hydroxypropyl, and hydroxyethyl; alkoxyalkyl, such as ethoxyethyl or ethoxypropyl; hydroxy; amino; or $R_3$ and $R_4$ together represent the group $-(CH_2)_2R_5-(CH_2)_2-$, where $R_5$ is oxygen, sulfur, $-CH_2-$ or $N-R_6$, and $R_6$ is hydrogen or loweralkyl, for example together with the N atom to which $R_3$ and $R_4$ are attached, they represent morpholino, thiomorpholino, piperidino, piperazino, 4-methylpiperazino or pyrrolidino.

The two reactants are contacted in a suitable inert solvent medium such as dioxane, tetrahydrofuran or an aromatic hydrocarbon, such as, benzene, at a temperature in the range of about 0–75° C. An excess of amine reactant is generally employed and good results are obtained with from about 2.0–5.0 moles of amine per mole of halocarbonate ester, such as chlorocarbonate ester, at reaction temperatures of from about 10–40° C. for most amines. It might be noted that the ester reactants are frequently referred to by those in this art as the haloformate (or halothionformate) esters of the 1-substituted-2-hydroxyalkyl (or mercaptoalkyl)-5-nitroimidazole.

The molar excess of amine is desired since it is convenient and customary to use 1 mole of the amine (in addition to the mole needed for the reaction itself) as an acid binding agent to neutralize the acid formed in the reaction. The haloformate ester starting material may be charged to the reaction in the form of an acid addition salt, and it is then necessary to have another mole of amine to neutralize this salt. As previously indicated, the amine present in the reaction medium may hydrolyze a 1-acyloxyalkyl imidazole substituent to the corresponding 1-hydroxyalkyl substituent.

Amines which are suitable for use in this reaction include ammonia, methylamine, dimethylamine, aniline, benzylamine, ethanolamine, propanolamine, ethoxyethylamine, ethoxypropylamine, hydroxylamine, hydrazine and morpholine, thiamorpholine, piperidine, piperazine, 4-methylpiperazine and pyrrolidine.

When ammonia is used as the amine reactant to form carbamates where $R_3$ and $R_4$ are both hydrogen, a very large excess is generally used, and frequently liquid ammonia is employed as reaction solvent. When the process is carried out with ammonia, the reaction temperature may be from about −35° C. (refluxing liquid ammonia) to about room temperature. At the higher temperatures, it is, of course, necessary to use a pressure vessel, or to dissolve the ammonia in an organic solvent such as chloroform or a loweralkanol such as ethanol or methanol.

Examples of carbamates which may be prepared in this way from the corresponding chloroformate or chlorothionformate ester are 1-methyl-5-nitroimidazol-2-ylmethyl carbamate,
1-ethyl-5-nitroimidazol-2-ylmethyl carbamate,
1-methyl-5-nitroimidazol-2-ylmethyl p-fluorophenylcarbamate,
1-methyl-5-nitroimidazol-2-ylmethyl p-chlorophenylcarbamate,
1-propyl-5-nitroimidazol-2-ylmethyl p-nitrophenylcarbamate,
1-methyl-5-nitroimidazol-2-ylmethyl thiolcarbamate,
1-methyl 5-nitroimidazol-2-ylmethyl methylcarbamate,
1-(2-hydroxy-ethyl)-5-nitroimidazol-2-ylmethyl ethylcarbamate,
1-(2-hydroxyethyl)-5-nitroimidazol-2-ylmethyl carbamate,
1-methyl-5-nitroimidazol-2-ylmethyl methylethylcarbamate,
1-(1-ethyl-5-nitroimidazol-2-yl)-ethyl ethylcarbamate,
1-methyl-5-nitroimidazol-2-ylmethyl methoxyethylcarbamate and
1-(1-methyl-5-nitroimidazol-2-yl)ethyl methylthioncarbamate.

(iv) Preparation of imidazole halocarbonate

The imidazole chlorocarbonate or chlorothioncarbonate ester used in the above process is obtained by reacting phosgene or thiophosgene at a temperature of between about −10° C. and room temperature with an imidazole of the structure

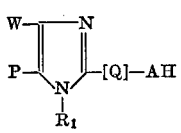

where W, P, Q, A and $R_1$ are as above. Generally the lower temperatures are used with phosgene, and higher temperatures with thiophosgene. The process is conducted in an inert organic solvent medium. Satisfactory solvents are dioxane, tetrahydrofuran and toluene, or mixtures thereof, as well as ketones and esters such as ethyl acetate. It is desirable to employ a solvent in which the imidazole reactant is essentially completely soluble. For best results, the process is conducted in the presence of an acid binding agent, normally a tertiary amine such as trialkylamine or dimethylaniline, although solvents such as tetrahydrofuran and dioxane may themselves be used as said binding agents in this reaction. The chloroformate or chlorothionformate ester may be isolated, if desired, but this is unnecessary and it is a preferred embodiment of the invention to prepare the ester in solution and to react it without isolation with the amine.

(v) The carbamyl halide/loweralkyl carbamate processes

An additional method for preparing the imidazolylalkyl carbamates of this invention comprises reacting a 1-substituted -2-hydroxyalkyl (or 2-mercaptoalkyl)-5-nitroimidazole with the appropriate carbamyl halide or lower alkyl carbamate. This process may be schematically represented as follows:

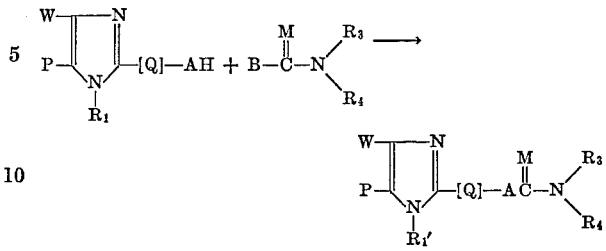

wherein W, P, $R_1$, $R_1'$, Q, A, M, $R_3$ and $R_4$ are as above, and B is halo or loweralkoxy.

In the preferred modification of this process, the significance of the substituents is as follows:

W is hydrogen;
P is nitro;
Q is loweralkylene suitably methylene or ethylene; or loweralkylidene suitably ethylidene;
$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;
B is chloro or methoxy or ethoxy;
$R_3$ and $R_4$ individually represent hydrogen; alkyl, suitably loweralkyl, such as methyl, ethyl or propyl; aryl, such as phenyl; aralkyl, suitably aryloweralkyl, such as benzyl, hydroxyalkyl, suitably hydroxyloweralkyl, such as hydroxymethyl, and hydroxyethyl; alkoxyalkyl, such as ethoxyethyl or ethoxypropyl; or $R_3$ and $R_4$ together represent the group $-(CH_2)_2R_5-(CH_2)_2-$, where $R_5$ is oxygen, sulfur, $-CH_2-$ or $-N-R_6$, and $R_6$ is hydrogen or loweralkyl, for example, together with the N-atom to which $R_3$ and $R_4$ are attached, they represent morpholino, thiamorpholino, piperidino, piperazino, 4-methylpiperazino or pyrrolidino. As will be understood by those in the art, when B is chloro, a carbamyl chloride is reacted with the 2-substituted imidazole, and when B is loweralkoxy, the reactant is an alkyl carbamate.

In order to prepare the imidazolylalkyl thioncarbamates, i.e., where M in the above structural formula is sulfur, a thiocarbamyl chloride is employed.

In the carbamyl chloride method, the two reactants are brought together in a suitably inert solvent medium, such as benzene, toluene, tetrahydrofuran or dioxane. It is preferred to use a slight molar excess (e.g. 1–15%) of carbamyl halide, and to have an acid binding agent present in the medium since acid is produced during the reaction. When this process is employed to make unsubstituted carbamates or thioncarbamates (where $R_3$ and $R_4$ are both hydrogen the carbamyl chloride reactant is generated into the reaction medium since it is a highly unstable compound. The disubstituted carbamyl chlorides are stable and are added directly to the reaction mixture.

When the imidazole is treated with a loweralkyl carbamate, e.g., ethyl or methyl carbamate, the two reactants are brought together in essentially equimolar amounts in the presence of a strong base, preferably an alkali metal alkoxide such as sodium ethoxide, sodium methoxide, potassium isopropoxide and the like in an inert solvent such as 1,2-dimethoxyethane. Because of the base present, an acyloxyloweralkyl radical at the 1-position of the imidazole ring will be saponified to the corresponding hydroxyloweralkyl substituent. Care should be taken not to prolong the reaction time unduly since the imidazole compound is sensitive to strong base.

Among the products which may be prepared by this process are 1-methyl-5-nitroimidazol-2-ylmethyl carbamate, 1-ethyl-5-nitroimidazol-2-ylmethyl carbamate, and 1-(2'-ethoxyethyl)-5-nitroimidazol-2-ylmethyl carbamate.

(vi) The phenyl halocarbonate method

Still another process which is very useful for preparing the novel imidazolylalkyl carbamates described herein comprises the conversion of a 1-substituted-2-hydroxyalkyl (or mercaptoalkyl) imidazole to a phenyl carbonate or phenyl thioncarbonate derivative, and subsequent treatment of said carbonate or thioncarbonate with an amine, as illustrated below:

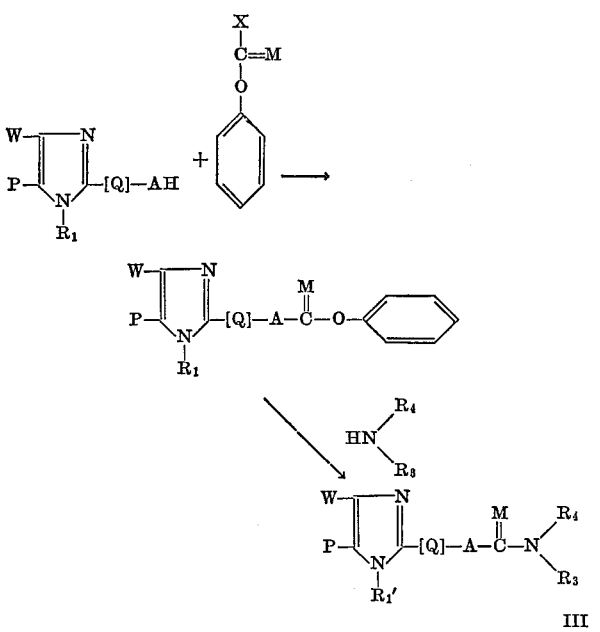

III wherein W, P, Q, $R_1$, $R_1'$, $R_3$, $R_4$, A and M are as above and X is halo.

This process for making imidazolylalkyl carbamates, which process is itself not a part of this invention, but is rather an invention of our colleague George Gal, is highly satisfactory for obtaining carbamates of the above Structure III.

In the preferred modification of this process, the significance of the substituents is as follows:

W is hydrogen;
P is nitro;
Q is loweralkylene suitably methylene or ethylene; or loweralkylidene suitably 1-ethylidene;
$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl, $R_1'$ is $R_1$ or hydroxyalkyl such as hydroxyethyl or hydroxypropyl;
A and M each represent oxygen or sulfur;
$R_3$ and $R_4$ individually represent hydrogen; alkyl, suitably loweralkyl, such as methyl, ethyl or propyl; aryl, such as phenyl; aralkyl, suitably arylloweralkyl, such as benzyl; hydroxyalkyl, suitably hydroxyloweralkyl, such as hydroxyethyl; alkoxyalkyl, such as ethoxyethyl or ethoxypropyl; hydroxy; amino; or $R_3$ and $R_4$ together represent the group —$(CH_2)_2R_5$—$(CH_2)_2$—, where $R_5$ is oxygen, sulfur, —$CH_2$— or N—$R_6$, and $R_6$ is hydrogen or loweralkyl, for example when taken together with the N-atom to which they are attached, they represent morpholino, thiomorpholino, piperidino, piperazino, 4-methylpiperazino or pyrrolidino.

In carrying out this last-mentioned process, a 1-loweralkyl-2-hydroxyalkyl (or mercaptoalkyl)-5-nitroimidazole such as 1-acyloxyalkyl-2-hydroxyalkyl (or mercaptoalkyl)-5-nitroimidazole such as is first reacted for example with phenoxy carbonyl chloride (phenyl chloroformate) or phenoxythiocarbonyl chloride (phenyl thionchloroformate). This reaction is conveniently brought about in an organic solvent, such as pyridine, one of the picolines, or lutidine. These bases, in addition to serving as the liquid solvent medium, also serve to bind the acid formed during the reaction. Alternatively, a non-basic solvent for the reactants such as dioxane or chloroform may be employed, and sufficient tertiary amine or alkali metal hydroxide added to bind the liberated hydrogen chloride. It is preferred to employ a slight molar excess of phenyl chloroformate reactant and to carry out the process at temperatures of from about —5° C. to about 45° C. Preferably, the reactants are mixed at about 0° C. and the reaction then continued at about room temperature for the desired time. When a phenyl carbonate of a 2-hydroxymethyl or 2-mercaptomethyl is being prepared, reaction times of from about 1–5 hours are satisfactory for good results. However, longer times of up to about 30 hours may be necessary for complete reaction in the case of 2-(α-hydroxyethyl) and 2-(α-mercaptoethyl)imidazoles. The resulting imidazole phenyl carbonate, such as for instance 1-methyl-5-nitroimidazol-2-ylmethyl phenyl carbonate or 1-methyl-5-nitroimidazol-2-ylmethyl phenyl thioncarbonate is conveniently recovered by quenching the reaction mixture in ice water, thus precipitating the desired product. These substances may be used without further purification in the next step of the process, and this is preferred in the case of the phenyl thioncarbonates which are less stable than the phenyl carbonates.

The imidazolylalkyl carbamate is then obtained by intimately contacting the imidazole phenyl carbonate or phenyl thioncarbonate with an amine in an inert organic solvent medium. For this purpose, chloroform or ethers such as dioxane, tetrahydrofuran or ethylene glycol dimethyl ether are satisfactory. It will, of course, be understood that the particular carbamate produced will depend upon the amine reactant used. The reaction is a rapid one and is normally substantially complete in about 1–5 hours. The imidazole phenyl carbonate and the amine may be reacted in essentially equimolar amounts although it is preferred to employ an excess of the amine. Good results are obtained by using from 1.0–4 moles of amine per mole of phenyl carbonate. When the unsubstituted carbamate itself is being prepared, it is convenient and preferred to use a very large excess of liquid ammonia since the excess serves as reaction solvent and the resulting carbamate moiety is stable and not destroyed under such conditions. In preparing the unsubstituted thioncarbamate, however, it is preferable to employ about 2 moles of ammonia per mole of thioncarbonate and to carry out the reaction at about room temperature in a solvent such as chloroform or an ether. Where $R_1$ in Structure III is hydroxyalkyl, it is preferred to carry out the reaction on a 1-acyloxyalkylimidazole, for example, a 1-acetoxyalkylimidazole or a 1-benzoyloxyalkylimidazole, such as 1-(2'-acetoxyethyl)-2-hydroxymethyl-5-nitroimidazole, and followed by removal of the acyl group by base hydrolysis after completion of the reaction. It should be noted, however, that in the second stage of the process, that is to say, the reaction with the amine, the basicity of the amine is often sufficient to bring about this hydrolysis.

Representative examples of imidazolylalkyl carbamates which may be prepared by this method are:

1-methyl-5-nitroimidazol-2-ylmethyl carbamate;
1-ethyl-5-nitroimidazol-2-ylmethyl p-fluorophenylcarbamate;
1-(2-hydroxyethyl)-5-nitroimidazol-2-ylmethyl N-(2-methoxyethyl) carbamate;
1-(1-methyl-5-nitroimidazole-2-yl)ethylcarbamate;
1-methyl-5-nitroimidazol-2-ylmethyl thioncarbamate;
1-propyl-5-nitroimidazol-2-ylmethyl thiolcarbamate;
1-methyl-5-nitroimidazol-2-ylmethyl hydroxycarbamate and
1-(2-hydroxypropyl)-5-nitroimidazol-2-ylmethyl methylcarbamate.

(vii) Preparation of pseudo-thioureido imidazoles

The compounds of Formula I above, wherein M is imino or substituted imino are obtained by reacting a 1- substituted-2-halomethyl or sulfonyloxymethyl imidazole with a thiourea or substituted thiourea as shown by the following reaction scheme:

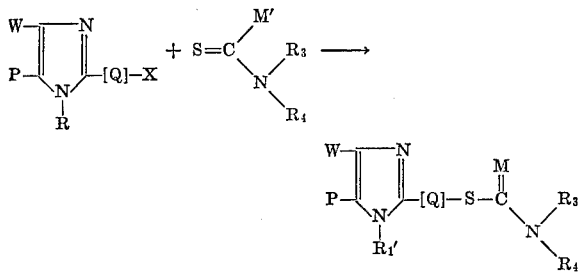

wherein W, P, $R_1$, $R_1'$, Q, S, $R_3$ and $R_4$ are as above and M is imino or substituted imino, and X is halo or substituted sulfonyloxy.

In the preferred modification of this process, the significance of the substituents is as follows:

W is hydrogen;
P is nitro;
Q is loweralkylene suitably methylene or ethylene; or loweralkylidene suitably 1-ethylidene;
$R_1$ is loweralkyl suitably methyl, ethyl or propyl or acyloxyalkyl, suitably loweralkanoyloxyalkyl, such as acetoxypropyl or valeroxyethyl, or aroyloxyalkyl such as benzoyloxyethyl or benzoyloxypropyl; $R_1'$ is $R_1$ or hydroxyalkyl such as hydroxyethyl or hydroxypropyl;
A is sulfur;
M is imino; or alkylimino, such as methyl, propyl or pentylimino;
M' is amino or alkylamino, such as methyl, propyl or pentylamino;
$R_3$ and $R_4$ individually represent hydrogen; alkyl, suitably loweralkyl, such as methyl, ethyl or propyl; aryl, such as phenyl; aralkyl, suitably arylloweralkyl, such as benzyl; hydroxyalkyl, suitably hydroxyloweralkyl, such as hydroxymethyl, and hydroxyethyl; alkoxyalkyl, such as ethoxyethyl or ethoxypropyl; or $R_3$ and $R_4$ together represent the group —$(CH_2)_2R_5$—$(CH_2)_2$—, where $R_5$ is oxygen, sulfur, —$CH_2$— or N—$R_6$, and $R_6$ is hydrogen or loweralkyl, for example taken together with the N-atom to which $R_3$ and $R_4$ are attached, they represent morpholino, thiamorpholino, piperidino, 4-methylpiperazine or pyrrolidino; and
X is chloro, methylsulfonyl or p-toluenesulfonyl.

The reaction is carried out in an organic solvent medium, preferably a loweralkanol, suitably ethanol or methanol. It is preferred to use essentially equimolar quantities of the two reactants, or a slight molar excess of the 2-haloalkyl or 2-sulfonyloxyalkyl imidazole reactants. Acid is formed in the reaction, and the products are normally recovered as the hydrochloride or sulfonate acid addition salts. Included among the compounds prepared in accordance with this process are:

S-(1-methyl-5-nitroimidazol-2-yl-methyl)-pseudothiourea;
S-1-(1'-methyl-5'-nitroimidazol-2'-yl)ethyl-pseudothiourea;
S-(1-acetoxyethyl-5-nitroimidazol-2-ylmethyl)-pseudothiourea; and
S-(1-methyl-5-nitroimidazol-2-ylmethyl)-pseudodimethylthiourea.

(II) THE SPECIFIC PROCESSES

The following processes are directed to the preparation of carbamates having particular substituents attached to the nitrogen of the carbamate group. Although these processes are directed to the formation of the compounds having these particular substituents, it should be understood that they are not specifically limited thereto.

(i) 5-nitroimidazol-2-ylalkyl N-(2',2',2'-trihalo-1'-hydroxyethoxy)carbamates 5-nitroimidazol-2-ylalkyl N-(2',2',2'-trihalo-1'-hydroxyethoxy)carbamates may be obtained by reacting the corresponding 5 - nitroimidazol-2-ylalkyl N - hydroxycarbamate with a trihalo substituted acetaldehyde. In the preferred procedure, the 5-nitroimidazole, suitably a 1-$R_1$-5-nitroimidazol-2-ylmethyl N-hydroxycarbamate, wherein $R_1$ is as shown in column 2 above, but having a significance other than hydroxyalkyl, for example, 1-methyl-5-nitroimidazol-2-yl-methyl N-hydroxycarbamate is mixed with the haloacetaldehyde, for example, chloralhydrate or bromalhydrate in approximately equimolar proportions and heated under reflux in the presence of a drying agent, for example, anhydrous magnesium sulfate for from about 6 to about 12 hours. In the preferred method of isolation, the reaction mixture is filtered and the product recovered from the filtrate. Among the compounds which may be produced in accordance with this procedure are:

1-methyl-5-nitroimidazol-2-ylmethyl N-(2',2',2'-trichloro-1'-hydroxyethoxy)carbamate;
1-ethyl-5-nitroimidazol-2-ylmethyl N-(2',2',2'-trichloro-1'-hydroxyethoxy)carbamate;
1-acetoxyethyl-5-nitroimidazol-2-ylmethyl N-(2',2',2'-trichloro-1'-hydroxyethoxy)carbamate; and
1-methyl-5-nitroimidazol-2-ylmethyl N-(2',2',2'-trifluoro-1'-hydroxyethoxy)carbamate.

Where it is desired to obtain a compound of this class having a 1-hydroxyalkyl substituent, the reaction is carried out using the corresponding 1-acyloxy hydroxycarbamate and subjecting the thus produced N-(2',2',2'-trihalo-1'-hydroxyethoxy)carbamate to base hydrolysis.

(ii) 5-nitroimidazol-2-ylalkyl N-hydroxymethylcarbamate 5-nitroimidazol-2-ylalkyl N-hydroxymethylcarbamates may be obtained by reacting the corresponding 5-nitroimidazol-2-ylalkyl carbamate with formaldehyde. In the preferred modification of the process, the 5-nitroimidazole carbamate, suitably a 1-$R_1$-5-nitroimidazol-2-ylmethylcarbamate, wherein $R_1$ is as shown in column 2 above but having a significance other than hydroxyalkyl or carboxyalkyl, is dissolved in an inert solvent, dimethyl sulfoxide being particularly suitable, and heated in a sealed vessel with an excess of paraformaldehyde, 2 moles excess being preferred, at from 70–150° C. for from 18 to 30 hours. In one method of isolation, the solvent is evaporated from the reaction mixture, the residue dissolved in a suitable water miscible solvent, such as, dimethylformamide and water added. The product separates as a crystalline precipitate and may be isolated by filtration.

Included among the compounds which may be produced in accordance with this procedure are:

1-methyl-5-nitroimidazol-2-ylmethyl N-hydroxymethylcarbamate;
1-(1'-methyl-5'-nitroimidazol-2'-ylethyl) N-hydroxymethylcarbamate;
2-1'-methyl-5'-nitroimidazol-2'-yl)ethyl N-hydroxymethylcarbamate; and
1-ethyl-5-nitroimidazol-2-ylmethyl N-hydroxymethylcarbamate.

(iii) 5-nitroimidazol-2-ylalkyl N-alkoxyalkylcarbamate 5-nitroimidazol - 2 - ylalkyl N-alkoxyalkylcarbamates may be produced by reacting the corresponding 5-nitroimidazol-2-ylalkyl N-hydroxyalkyl carbamate with an alkanol in the presence of an acid. In the preferred procedure, the N-hydroxymethylcarbamate, suitably a 1-$R_1$-5-nitroimidazol-2-ylmethyl-N-hydroxycarbamate, wherein $R_1$ is as shown in column 2 above, but having a significance other than hydroxylalkyl or carboxyalkyl, for example, 1-methyl-5-nitroimidazol-2-ylmethyl N-hydroxymethylcarbamate, is mixed with the alkanol, for example, ethanol or methanol, in the presence of a catalytic amount of strong acid, hydrochloric acid or p-toluene sulfonic acid being preferred, and allowed to stir for 12 to 24 hours, at between 15° C. and 30° C. The product may be isolated by extraction of the reaction mixture with a suitable solvent such as, chloroform and working up in the usual manner.

Included among the products which may be obtained by means of this procedure are:

1-methyl-5-nitroimidazol-2-ylmethyl N-ethoxymethylcarbamate;
1-(1'-methyl-5'-nitroimidazol-2'-ylethyl) N-hydroxy methylcarbamate;
1-(1'-methyl-5'-nitroimidazol-2'-yl)-ethyl N-methoxymethylcarbamate; and
1-ethyl-5-nitroimidazol-2-ylmethyl N-ethoxymethylcarbamate.

(iv) 5-nitroimidazol-2-ylalkyl N-alkoxycarbamates 5-nitroimidazol-2-ylalkyl N-alkoxycarbamates may be prepared by reacting the corresponding 5-nitroimidazole N-hydroxycarbamate with a diazo hydrocarbon. In the preferred procedure, the 5-nitroimidazole N-hydroxycarbamate, suitably a 1-$R_1$-5-nitroimidazol-2-ylmethyl-N-hydroxycarbamate, wherein $R_1$ is as shown in column 2 above but having a significance other than hydroxyalkyl or carboxyalkyl, for example, 1-methyl-5-nitroimidazol-2-ylmethyl N-hydroxycarbamate is dissolved in an alkanol, for example, methanol or ethanol and treated with an excesss of diazo hydrocarbon, suitably in solution, for example, an ethereal solution of diazomethane, diazoethane or diazophenylmethane. The product may be isolated in the form of an acid salt. In one suitable method of isolation, the reaction mixture is filtered, the residue chromatographed on silica gel and the residue, after evaporation of the eluate, treated with one equivalent of a solution of acid, suitably p-toluenesulfonic acid in methylethylketone.

Included among the products which may be obtained by this procedure are:

1-methyl-5-nitroimidazol-2-ylmethyl N-methoxycarbamate;
1-methyl-5-nitroimidazol-2-ylmethyl N-methyl-N-methoxycarbamate;
1-ethyl-5-nitroimidazol-2-ylmethyl N-ethoxycarbamte; and
1-(2'-acetoxyethyl)-5-nitroimidazol-2-ylmethyl N-phenylmethoxycarbamate.

(v) Acylation of 5-nitroimidazol-2-ylalkyl carbamates, N-hydroxycarbamates and N-alkylhydroxycarbamates 5-nitroimidazo-2-ylalkyl carbamates, N - hydroxycarbamates may be acylated in the usual manner. In the preferred procedure, the compound to be acylated, for example a 1-$R_1$-5-nitroimidazol-2-ylmethyl carbamate wherein $R_1$ is as shown in column 2 above, provided however that $R_1$ has a value other than hydroxyalkyl or carbamoylalkyl, is reacted with an acylating agent such as an alkanoyl anhydride, suitably a loweralkanoyl anhydride, such as acetic anhydride, propionic anhydride or valeric anhydride; an alkanoyl halide, such as acetyl chloride or propionyl chloride; an aroyl halide, such as benzoyl halide; an alkenoyl halide suitably a loweralkenoyl halide, such as acryloyl chloride or crotonyl chloride or a cyano alkanoic acid in the presence of a dehydrating agent, for example, cyano acetic acid in the presence of acetic anhydride.

The product of the acylation reaction may be isolated by any of the usual procedures.

(vi) 5-ntroimidazol-2-ylalkyl N-(disubstituted aminomethyl)carbamates

5 - nitroimidazol-2-ylalkyl N-(disubstituted aminomethyl)carbamates may be produced by the reaction of a 5 - nitromidazol-2-ylalkyl carbamate with a disubstituted amine together with formaldehyde. In the preferred modification of the procedure, the 1-$R_1$-5-nitroimidazol-2-ylalkyl carbamates, for example, 1-methyl-5-nitroimidazol-2-ylmethyl carbamate together with a disubstituted amine including nitrogeneous heterocyclo alkanes, for example, a dialkylamine, such as dimethylamine, dipropylamine, or dipentylamine and alkylarylamine, for example N-methylaniline, a diarylamine such as diphenylamine or a diaralkylamine, such as dibenzylamine or a secondary cyclic amine, for example, morpholine, thiamorpholine, pyrrolidine, or N-methylpiperazine and paraformaldehyde, suitably in equimolar amounts, are taken up in a water miscible inert organic solvent, suitably dimethylformamide and heated in a sealed vessel at a temperature of from about 80° to about 150° C. for a period of from about 12 to about 30 hours. In a suitable method of isolation, the reaction solvent is removed, preferably under reduced pressure, and the residue dissolved in a polar solvent, suitably a ketonic solvent, such as methyl ethyl ketone and an acid in the same solvent, suitably p-toluene sulfonic acid is added thereto and the product isolated as the acid salt.

Included among the compounds which may be prepared in accordance with this procedure are:

1-methyl-5-nitroimidazol-2-ylmethyl N-(N',N'-dimethylaminomethyl)carbamate,
1-ethyl-5-nitroimidazol-2-ylmethyl N-(N',N'-dipropylaminomethyl)carbamate,
1-acetoxyethyl-5-nitroimidazol-2-ylmethyl N-(N'-methyl-N'-phenylaminomethyl)carbamate,
1-(1'-methyl-5'-nitroimidazol-2'-yl)ethyl N-(N',N'-diphenylaminomethyl)carbamate,
2-(1'-methyl-5'-nitroimidazol-2'-yl)ethyl N-(morpholin-4-ylmethyl)carbamate,
1-propyl-5-nitroimidazol-2-ylmethyl N-(4-methylpiperazin-1-ylmethyl) carbamate, and
1-(1'-hydroxyethyl-5'-nitroimidazol-2'-yl)ethyl N-pyrrolidin-1-ylmethyl)carbamate.

(vii) 5-nitroimidazol-2-ylalkyl N-(carboalkoxyalkylidene)carbamates 5-nitroimidazol-2-ylalkyl N - (carboalkoxyalkylidene) carbamates may be prepared by reacting 5-nitroimidazol-2-ylalkyl carbamate with a β-keto ester in the presence of an acid. In the preferred procedure, a 5-nitroimidazol-2-ylalkyl carbamate, for example, a 1-$R_1$-5-nitroimidazol-2-ylalkyl carbamate, wherein $R_1$ is as shown in column 2 above provided that $R_1$ is other than carbamoylalkyl, such as, 1-methyl-5-nitroimidazol-2-ylmethyl carbamate, is heated with a β-keto ester, such as ethylacetoacetate or ethyl 3-oxopentanoate in the presence of a catalytic amount of an anhydrous acid suitably an organic acid, such as, p-toluene sulfonic acid, at a temperature of from about 60° C. to about 100° C. for a period of from about 3 hours to about 24 hours. The product may be isolated by any suitable method, for example, the solvent may be removed by evaporation under reduced pressure, the residue washed thoroughly with ether, filtered and the ether removed under reduced pressure to yield a residue which may then be recrystallized, suitably from ether to yield the desired product. Included among the compounds which may be produced in accordance with this procedure are 1-methyl-5-nitroimidazol-2-ylmethyl N-[1'-carboethoxy-(prop-2'-ylidene)]carbamate,
1-ethyl-5-nitroimidazol-2-ylmethyl N-[1'-carboethoxy-(pent-2'-ylidene)]carbamate, and
1-(1'-ethyl-5'-nitroimidazol-2'-yl)ethyl N-[1''-carboethoxy-(pent-2''-ylidene)]carbamate.

(viii) 5-nitroimidazol-2-ylalkyl N-alkoxymethylene carbamates

5 - nitroimidazol-2-ylalkyl N-alkoxymethylene carbamates may be produced by reacting a 5-nitroimidazol- 2-ylalkyl carbamate with a trisubstituted orthoformate in the presence of a Lewis acid. In the preferred procedure, a 5-nitroimidazol-2-ylalkyl carbamate, such as a 1 - $R_1$-5-nitroimidazol-2-ylmethyl-N-hydroxycarbamate, wherein $R_1$ is as shown in column 2 above, but having a significance other than hydroxy alkyl or carboxy alkyl, suitably 1-methyl-5-nitroimidazol-2-ylmethyl carbamate, a Lewis acid, preferably boron trifluoride etherate, and a trisubstituted orthoformate, for example a trialkyl orthoformate, such as triethyl orthoformate, are heated together at a temperature of from about 60° to about 100° C. for from about 12 to about 18 hours. The product is then isolated. In a suitable method of isolation, the excess trisubstituted orthoformate is removed under reduced pressure, the residue taken up in a suitable water miscible organic solvent, for example chloroform, and washed with a mild base, suitably aqueous sodium bicarbonate; the product is then isolated from the chloroform solution. Included among the compounds which may be produced in accordance with the above procedure are:

1-methyl-5-nitroimidazol-2-ylmethyl N-ethoxymethylene carbamate,
1-ethyl-5-nitroimidazol-2-ylmethyl N-propyloxymethylene carbamate, and
1-[1'-(2''-hydroxyethyl)-5'-nitroimidazol-2'-ylethyl] N-benzyloxymethylene carbamate.

(ix) 5-nitroimidazol-2-ylalkyl N-formylcarbamates 5-nitroimidazol-2-ylalkyl N-formylcarbamates may be produced by reacting an N' - 5 - nitroimidazol-2-ylalkoxycarbonyl) $N^2,N^2$-dialkylformamidinium halide hydrohalide in a mild alkaline hydrolyzing agent. In the preferred modification of the procedure, an N'-(1-$R_1$-5-nitroimidazol - 2 - ylmethoxycarbonyl) $N^2,N^2$-dialkylformamidinium halide hydrohalide, as produced in accordance with the aforementioned procedure, is dissolved in a mild aqueous base, a solution of sodium bicarbonate in water being preferred, and the solution allowed to stand at a temperature of 15° to 30° C. for from about 12 to about 24 hours. The product may be isolated as the residue by filtration.

It should be noted that 1 - hydroxyalkyl or 1-carboxyalkyl compounds of this class cannot be prepared by this method, although the corresponding acyloxy derivatives, that is to say, 1-acyloxyalkyl and 1-carboxyacyl analogs may be obtained. It should be noted that an attempted hydrolysis of the acyl groups would simultaneously remove the formyl substituent on the carbamyl group.

(x) 5-nitroimidazol-2-ylalkyl $N^2$-alkylidenecarbazates 5-nitroimidazol-2-ylalkyl $N^2$-alkylidenecarbazates may be produced by reacting a 5-nitroimidazol-2-ylalkyl carbazate with a carbonyl compound. In the preferred modification of the procedure, a 1-$R_1$-5-nitroimidazol-2-ylmethyl carbazate wherein $R_1$ is as shown in column 2 above, such as 1-methyl-5-nitroimidazol-2-ylmethyl carbazate, is allowed to react (with or without a solvent) with an excess of carbonyl compound suitably an aldehyde or ketone, for example benzaldehyde, acetone, methylethylketone or acetophenone, and heated under reflux, for example, at a temperature of between 40° C. and 120° C. for a period of from 5 to 30 minutes. The product is then isolated, suitably the solvent is removed under reduced pressure and the product recrystallized from the residue. It should be noted that compounds wherein $R_1$ is oxoalkyl cannot be produced by this method.

Included among the compounds which may be produced in accordance with this procedure are:

1-methyl-5-nitroimidazol-2-ylmethyl $N^2$-butylidenecarbazate,
1-ethyl-5-nitroimidazol-2-ylmethyl $N^2$-benzylidenecarbazate, and
1-(1'-(2''-hydroxyethyl)-5'-nitroimidazol-2'-yl)ethyl $N^2$-isopropylidenecarbazate.

(xi) 5-nitroimidazol-2-ylalkyl N-acyl-N-acyloxycarbamates 5-nitroimidazol - 2 - ylalkyl N-acyl-N-acyloxycarbamates may be produced by reacting a 5-nitroimidazol-2-ylalkyl N-hydroxycarbamate with an excess of an acyl anhydride in the presence of a base catalyst. In a further modification of the process, a 1-$R_1$-5-nitroimidazol-2-ylalkyl N-hydroxycarbamate, wherein $R_1$ is as shown on page 2 above, but having a value other than hydroxyalkyl or carboxyalkyl such as 1-methyl-5-nitroimidazol-2-ylmethyl N-hydroxycarbamate is heated together with a weak base, suitably potassium acetate or sodium carbonate, and respectively an alkanoic anhydride or aralkanoic anhydride, for example, acetic anhydride, propionic anhydride or benzoic anhydride, at a temperature of from about 70° C. to about 100° C. for a period of from about 1 to about 5 hours. The product may then be isolated. Suitably, the isolation is carried out by removing the volatile components from the reaction mixture at reduced pressure and extracting the residue with a mixture of water and a water immiscible organic solvent, suitably chloroform. The product is then isolated and the chloroform extracted in the usual manner.

Included among the compounds which may be produced by the above procedure are:

1-methyl-5-nitroimidazol-2-ylmethyl N-acetyl-N-acetoxycarbamate,
1-ethyl-5-nitroimidazol-2-ylmethyl N-butyryl-N-butyroxycarbamate,
1-(1'-ethyl-5'-nitroimidazol-2-yl)ethyl N-benzoyl-N-benzoyloxycarbamate, and
2-(1'-ethyl-5'-nitroimidazol-2'-yl)ethyl N-phenylacetyl-N-phenylacetoxycarbamate.

The 1-substituted-2-imidazolylalkyl carbamates of Formulas I and II above have antiprotozoal activity, and are particularly active against the causative organisms of the protozoal parasitic diseases trichomoniasis and enterohepatitis. Certain of them are also effective against amoebiasis and trypanosomiasis, as well as against the PPLO organisms and schistosomes. It will, of course, be understood that the compounds differ in their degree of efficacy against these various organisms.

Trichomoniasis is a protozoan disease caused by parasites of the genus Trichomonas. The compounds of the invention are effective against the particularly troublesome form of trichomoniasis known as *T. vaginalis vaginitis*, caused by infestation of the vagina with *T. vaginalis*. In treating this disease, the imidazolylalkyl carbamates may be administered either orally or topically. For oral administration unit dosage, forms such as tablets or capsules are normally employed which may contain from about 50 to about 500 mg. of active ingredient. These are prepared by techniques known in the art, and contain the usual diluents, granulating agents, extenders and/or lubricating agents known to be satisfactory for the compounding of tablets and capsules. It is preferred to administer the compounds of the invention orally at a dose level of from about 25–1,000 mg./day, in either single or divided doses with divided doses being used more frequently than a single daily dose. An example of a suitable compressed tablet is the following:

| Component | Mg. per tablet |
|---|---|
| 1-methyl-5-nitroimidazol-2-ylmethyl carbamate | 250 |
| Dicalcium phosphate | 100 |
| Lactose | 75 |
| Starch | 50 |
| Guar gum | 12 |
| Magnesium stearate | 2–3 |

If desired, tablets may be sugar coated or enteric coated by standard techniques. Alternatively, the anti-trichomonal agent may be formulated in capsule form using fillers such as lactose, starch or kaolin. A typical capsule would contain 250 mg. of, for instance, 1-methyl-5-nitro-imidazol-2- ylmethyl methylcarbamate, 2–3 g. of magnesium stearate and about 75 mg. of lactose in a No. 0 size capsule. Tablets and capsules containing smaller quantities of active ingredient may be made by reducing proportionately the amounts of excipients and diluents illustrated above. Alternatively, the carbamates may be administered orally in liquid pharmaceutical vehicles such as solutions, emulsions, syrups or suspensions containing the diluents, flavoring agents and preservatives customarily employed in the pharmaceutical art.

For topical application, vaginal creams or suppositories containing the active ingredient may be used. To illustrate, a cream is prepared by mixing sufficient quantities of hydrophilic ointment and water, containing from about 5–10% by weight of carbamate, in sufficient quantities to produce a cream having the desired consistency.

Representative examples of carbamates of this invention that are highly active and thus particularly useful for treating trichomoniasis are:

1-methyl-5-nitroimidazol-2-ylmethyl carbamate,
1-methyl-5-nitroimidazol-2-ylmethyl methylcarbamate,
1-methyl-5-nitroimidazol-2-ylmethyl 4-morpholine-carboxylate,
1-methyl-5-nitroimidazol-2-ylmethyl thiolcarbamate,
1-methyl-5-nitroimidazol-2-ylmethyl methylthion-carbamate,
1-methyl-5-nitroimidazol-2-ylmethyl thioncarbamate,
1-(1'-methyl-5'-nitroimidazol-2'-yl)ethyl carbamate,
1-(1'-methyl-5'-nitroimidazol-2'-yl)ethyl hydroxy-carbamate,
1-methyl-5-nitroimidazol-2-ylmethyl hydroxycarbamate,
1-ethyl-5-nitroimidazol-2-ylmethyl carbamate, and
1-ethyl-5-nitroimidazol-2-ylmethyl hydroxycarbamate.

These represent preferred anti-trichomonal agents of the invention, although the other imidazolylalkyl carbamates of the invention are of value against this disease.

Enterohepatitis is a disease occurring primarily in turkeys and is caused by the protozoan parasite *Histomonas meleagridis*. It is also known as turkey blackhead diseases. The imidazolylalkyl carbamates of this invention are useful in the prevention and treatment of this disease and for this purpose are administered to turkeys mixed with an element of turkey sustenance, i.e. in the feed or drinking water. Although the optimum dose level will depend on the particular compound employed and the severity of the infection, good control of enterohepatitis is obtained by orally administering to the turkeys a feed containing from about 0.003% to about 0.1% by weight of carbamate. When the material is administered via the drinking water, somewhat higher levels may be employed, especially for therapeutic use. For instance, the drinking water may contain up to about 0.2% by weight of the active ingredient with good results. Those substances previously mentioned as preferred anti-trichomonal agents are also among those preferred in combating turkey blackhead.

As previously stated, the imidazolylalkyl carbamate described herein may also be employed against trypanosomiasis and amoebiasis. In addition, certain of them, and particularly 1-methyl-5-ntroimidazol-2-ylmethyl carbamate, 1-methyl-5-ntroimidazol-2-ylmethyl hydroxycarbamate and 1-ethyl-5-nitroimidazoyl-2-ylmethyl carbamate, possess activity against the pleuro-pneumonia like organisms which have come to be known as PPLO organisms.

The imidazolylalkyl carbamates are effective against PPLO organisms when the compound is administered to fowl or swine in feed containing from about 0.003% to about 0.1% by weight of carbamate. The preferred dosage level, however, is between from about 0.003% to 0.08% by weight.

Certain of the substituted imidazoles which are employed as intermediates in making those new imidazolylalkyl carbamates also possess useful antiparasitic activity. Of particular interest in this regard are the 1-loweralkyl-2-thiocyanoalkyl-5-nitroimidazoles, and especially 1-methyl-2-thiocyanomethyl-5-nitroimidazole. These compounds have anti-trichomonal activity and may be employed against trichomoniasis in the same manner and within the same dose levels as described previously for the imidazoylalkyl carbamates.

The following examples are given for the purpose of illustration and not by way of limitation.

It is noted that starting materials for these examples are known and/or described in the art. In addition, Belgium Pat. 683,796 issued Jan. 9, 1967 contains a more complete description of preparative methods for the starting materials. This Belgium patent is a foreign equivalent of U.S. Ser. No. 550,932 field May 18, 1966, a parent application of the instant application.

EXAMPLE 1

1-methyl-5-nitroimidazol-2-yl-methyl chloroformate 3.12 g. 1-methyl - 2 - hydroxymethyl-5-nitroimidazole is dissolved in a mixture of 4.3 ml. of dimethylaniline and 20 ml. of dioxane. This solution is then added dropwise to 30 ml. of phosgene. The resulting suspension is stirred for two hours at 0–5° C., and then for two hours at room temperature. The solvent is then removed by blowing dry nitrogen through the suspension for two hours. The oil remaining at the end of this time consists predominantly of 1-methyl-5-nitroimidazol-2-ylmethyl chloroformate.

In accordance with the above procedure, but starting with 1-methyl - 2 - mercaptomethyl-5-nitroimidazole, in place of 1-methyl - 2 - hydroxymethyl-5-nitroimidazole, there is obtained 1-methyl - 5 - nitroimidazol-2-yl-methyl chlorothioformate.

In accordance with the above procedure and starting with either of the aforementioned nitroimidazoles but using thiophosgene in place of phosgene, there is obtained 1-methyl - 5 - nitroimidazol - 2 - yl-methyl chlorothioformate and 1-methyl-5-nitroimidazol-2-yl-methyl chlorodithioformate.

EXAMPLE 2

1-methyl-5-nitroimidazol-2-ylmethyl carbamate 0.05 g. of 1-methyl - 5 - nitroimidazol-2-ylmethyl phenyl carbonate is dissolved slowly in 50 ml. of liquid ammonia. After solution is complete, the ammonia is permitted to evaporate and the residue washed with ethanol and recrystallized from methanol to yield 1-methyl-5-nitroimidazol-2-ylmethyl carbamate; M.P. 166–170° C.

In accordance with the above procedure, but starting with 1-(1-methyl - 5 - nitroimidazol-2-yl)-ethyl phenyl carbonate, 2-(1-methyl - 5 - nitroimidazol - 2 - yl)-ethyl phenyl carbonate and 3-(1-methyl-5-nitroimidazol-2-yl)-prop-2-en-1-yl phenyl carbonate in place of 1-methyl-5-nitroimidazol-2-yl-methyl phenyl carbonate there is obtained the corresponding 1-(1-methyl-5-nitroimidazol-2-yl)ethyl carbamate, 2-(1-methyl-5-nitroimidazol-2-yl)ethyl carbamate, and 3-(1-methyl-5-nitroimidazol-2-yl)prop-2-enyl carbamate.

EXAMPLE 3

1-methyl-5-nitroimidazol-2-ylmethyl carbamate 3.12 g. of 1-methyl-2-hydroxymethyl-5-nitroimidazole is dissolved in 100 ml. of methylene dichloride and cooled to 0° C. 2.64 g. of sodium cyanate and 4.5 g. of trifluoroacetic acid are added. The flask is stoppered tightly and the mixture stirred for 24 hours at 0° C. 200 ml. of methylene chloride is then added and the mixture washed with saturated aqueous potassium bicarbonate solution. The methylene chloride solution is concentrated to dryness in vacuo to give a residue of 1-methyl-5-nitro-2-imidazolylmethyl carbamate. This solid is recrystallized from a minimum volume of ethyl acetate to give substantially pure 1-methyl - 5 - nitroimidazol-2-ylmethyl carbamate; M.P. 166–170° C.

EXAMPLE 4

1-methyl-5-nitroimidazol-2-ylmethyl thiolcarbamate 1.35 g. of 1-methyl-2-chloromethyl-5-nitroimidazole is dissolved in 25 ml. of dry ethanol at room temperature, and 1.11 g. of potassium thiocyanate is added to this solution. The resulting mixture is refluxed for two hours and then allowed to stand at room temperature for about 12 hours. It is warmed to about 75° C. on a steam bath and the solid material removed by filtration. The filtrate is diluted with an equal volume of water and the resulting solution chilled and scratched to induce crystallization. The solid which forms is removed by filtration, washed with ice-water and dried. It is 1-methyl-2-thiocyanomethyl-5-nitroimidazole; M.P. 87–88° C. This product is crystallized from a minimum volume of benzene containing a trace of hexane to give yellow crystals of 1-methyl-2-thiocyanomethyl-5-nitroimidazole; M.P. 87.5–88° C.

5 g. of 1-methyl-2-thiocyanomethyl-5-nitroimidazole is added portionwise over a period of 15 minutes to 25 ml. of cold concentrated sulfuric acid. The resulting solution is held at 0° C. for about 14 hours and then poured onto an excess of crushed ice. The solution is adjusted to pH 6 with saturated potassium bicarbonate solution. The solid material is removed by filtration and washed with ice-water. The solid is extracted with about 10 ml. of ethyl acetate and the ethyl acetate solution dried over sodium sulfate and then concentrated essentially to dryness. A small volume of hexane is added to the residue and the solid 1-methyl-5-nitro-2-imidazolylmethyl thiolcarbamate removed by filtration. There are obtained in this way 4.34 g. of 1-methyl-5-nitroimidazol-2-ylmethyl thiolcarbamate; M.P. 138–140° C.

EXAMPLE 5

1-methyl-5-nitroimidazol-2-ylmethyl carbamate 1-methyl - 5 - nitroimidazol-2-ylmethyl chloroformate as obtained in accordance with Example 1 is cooled to 0° C. and 25 ml. of liquid ammonia added thereto. The resulting mixture is stirred for 10 minutes in the cold and then an additional 25 ml. of liquid ammonia is added. The mixture is then allowed to warm to room temperature and stirred until the excess ammonia evaporates. The residue thus obtained is dissolved in 100 ml. of water and the aqueous solution extracted with three 100 ml. portions of ethyl acetate. The ethyl acetate extracts are combined, backwashed with 25 ml. of water and then dried over sodium sulfate. The ethyl acetate is then concentrated to dryness in vacuo to give a residue consisting of 1-methyl-5-nitroimidazol-2-ylmethyl carbamate. The product is recrystallized from ethyl acetate and then from water to give substantially pure material; M.P. 172–173° C.

In accordance with the above procedure but starting with 1-methyl - 5 - nitroimidazol-2-ylmethyl chlorothiolformate, 1-methyl - 5 - nitroimidazol-2-ylmethyl chlorothionformate, 1-methyl - 5 - nitroimidazol - 2 - ylmethyl chlorodithioformate in place of 1-methyl-5-nitroimidazol-2-ylmethyl chloroformate, there is obtained the corresponding 1-methyl - 5 - nitroimidazol-2-ylmethyl thiolcarbamate, 1-methyl - 5 - nitroimidazol-2-ylmethyl thioncarbamate, and 1-methyl-5-nitroimidazol-2-ylmethyl dithiocarbamate.

EXAMPLE 6

1-methyl-5-nitroimidazol-2-ylmethyl carbamate 3.1 g. (0.02 mole) of (1-methyl-2-hydroxymethyl)-5-nitroimidazole is dissolved in 100 ml. of benzene and 25 ml. of pyridine, 1.9 g. (0.022 mole) of gaseous carbamyl chloride is introduced into the stirred solution. The solution is allowed to stand at 15° C. for 8 hours and then concentrated under reduced pressure. The residue is taken up in ethyl acetate, washed with ice-water, and the ethyl acetate extract dried over sodium sulfate. On evaporation of the solvent under reduced pressure, the residue is recrystalized from acetone or ethyl acetate to yield 1-methyl - 5 - nitroimidazol-2-ylmethyl carbamate; M.P. 166–170° C.

In accordance with the above procedure but using dimethylcarbamyl chloride or diethylcarbamyl chloride and adding these reagents in liquid rather than gaseous form to the reaction mixture in place of using carbamyl chloride, there is obtained the corresponding 1-methyl-5-nitroimidazol-2-ylmethyl N,N-dimethylcarbamate and 1-methyl-5-nitroimidazol-2-ylmethyl N,N-diethylcarbamate.

In accordance with the above procedure but using thiocarbamoyl chloride, dimethylthiocarbamoyl chloride, and diethylcarbamoyl chloride, in place of carbamoyl chloride, there is obtained 1 - methyl - 5-nitroimidazol-2-ylmethyl thioncarbamate, 1-methyl-5-nitroimidazol-2-ylmethyl N,N-dimethylthioncarbamate, and 1-methyl-5-nitroimidazol-2-ylmethyl N,N-diethylthioncarbamate.

EXAMPLE 7

1-methyl-5-nitroimidazol-2-ylmethyl thiolcarbamate 3.5 g. (0.02 mole) of 1-methyl-2-mercapto methyl-5-nitroimidazole is dissolved in 100 ml. of benzene and 25 ml. of pyridine under nitrogen. 1.9 g. (0.022 mole) of gaseous carbamoyl chloride is introduced into the stirred solution. The solution is allowed to stand at 15° C. for 8 hours and then concentrated under reduced pressure. The residue is taken up in ethyl acetate, washed with ice-water and the ethyl acetate extract dried over sodium sulfate. On evaporation of the solvent under reduced pressure, the residue is recrystallized from acetone or ethyl acetate to yield 1-methyl-5-nitroimidazol-2-ylmethyl thiolcarbamate; M.P. 138–140° C.

In accordance with the above procedure but using dimethylcarbamoyl cholride or diethylcarbamoyl chloride and adding these reagents in liquid rather than gaseous form to the reaction mixture in place of carbamoyl chloride, there is obtained the corresponding 1 - methyl-5-nitroimidazol - 2 - ylmethyl N,N-dimethylthiolcarbamate and 1-methyl-5-nitroimidazol-2-ylmethyl N,N-diethylthiolcarbamate.

In accordance with the above procedure but using thiocarbamoyl chloride and dimethylthiocarbamoyl chloride and diethylcarbamoyl chloride, in place of carbamoyl chloride, there is obtained 1-methyl-5-nitroimidazol-2-ylmethyl dithiocarbamate, 1 - methyl-5-nitroimidazol-2-ylmethyl N,N-dimethyldithiocarbamate, and 1 - methyl-5-nitroimidazol-2-ylmethyl N,N-diethyldithiocarbamate.

EXAMPLE 8

1-methyl-5-nitroimidazol-2-ylmethyl carbamate 1.57 g. (0.01 mole) of 1-methyl-2-hydroxymethyl-5-nitroimidazole, 0.1 g. sodium ethoxide, 10 g. of ethyl carbamate, and 20 ml. of benzene are heated under reflux for 2 hours. The solvent is removed under reduced pressure and the residue stirred with 10 ml. of water. The mixture is extracted with ethyl acetate. The ethyl acetate fraction is dried over sodium sulfate and evaporated to give crude 1-methyl-5-nitroimidazol-2-ylmethyl carbamate.

In accordance with the above procedure but starting with 1-methyl-2-mercaptomethyl-5-nitroimidazole, in place of 1-methyl-2-hydroxy methyl-5-nitroimidazole and using ethyl carbamate, there is obtained the corresponding 1-methyl-5-nitroimidazol-2-ylmethyl thiolcarabamate.

EXAMPLE 9

1-methyl-5-nitroimidazol-2-ylmethyl methylcarbamate 6 g. of 1-methyl-2-hydroxymethyl-5-nitroimidazole and 3.5 ml. of methyl isocyanate are added to 200 ml. of benzene containing 0.5 ml. of pyridine. The resulting mixture is refluxed until complete solution is obtained. The solvent is then removed by evaporation under reduced pressure. The partially crystalline material thus obtained is recrystallized from 12 ml. of water to give 1.14 g. of 1 - methyl-5-nitroimidazol-2-ylmethyl methylcarbamate; M.P. 99–101° C.

In accordance with the above procedure, but starting with 1 - methyl - 2-mercaptomethyl-5-nitroimidazole, in place of 1-methyl-2-hydroxymethyl-5-nitroimidazole, there is obtained the corresponding 1-methyl-5-nitroimidazol-2-ylmethyl thiolcarbamate.

EXAMPLE 10

1-methyl-5-nitroimidazol-2-ylmethyl methylthioncarbamate 0.5 g. of 1 - methyl-2-hydroxymethyl-5-nitroimidazole and 0.28 g. of methyl isothiocyanate are added to 20 ml. of benzene containing 0.54 ml. of triethylamine. The resulting mixture is refluxed for 23 hours. It is then concentrated almost to dryness in vacuo and the solid material removed by filtration. This product is 1-methyl-5-nitroimidazol-2-ylmethyl methylthioncarbamate; M.P. 133.5–135° C. It is recrystallized from water to give substantially pure material; M.P. 135.5–136° C.

In accordance with the above procedure, but starting with 1-methyl-2-mercaptomethyl-5-nitromidazole, in place of 1 - methyl-2-hydroxymethyl-5-nitromidazole, there is obtained the corresponding 1-methyl-5-nitroimidazol-2-ylmethyl dithiocarbamate.

EXAMPLE 11

1-n-butyl-5-nitroimidazol-2-ylmethyl carbamate

A mixture of 16.9 g. (0.1 mole) of 1-n-butyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-n-butyl-2-hydroxymethyl-5-nitroimidazole.

A solution of 2.0 g. (0.01 mole) of 1-n-butyl-2-hydromethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-n-butyl-5-nitroimidazol-2-ylmethyl phenyl carbonate is separated by filtration.

A solution of 640 mg. (0.002 mole) of 1-n-butyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-n-butyl-5-nitroimidazol-2-ylmethyl carbamate is obtained after evaporating the solvent and washing the residue with water.

In accordance with the above procedure, but starting with 1-methyl-5-nitroimidazole, 1- ethyl-5-nitroimidazole and 1-propyl-5-nitroimidazole, in place of 1-n-butyl-5-nitroimidazole, there is obtained the corresponding 1-methyl-5-nitroimidazol-2-ylmethyl carbamate, 1-ethyl-5-nitroimidazol-2-ylmethyl carbamate, and 1-propyl-5-nitroimidazol-2-ylmethyl carbamate.

EXAMPLE 12

1-allyl-5-nitroimidazol-2-ylmethyl carbamate

A mixture of 15.3 g. (0.1 mole) of 1-allyl-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-allyl-2-hydroxymethyl-5-nitroimidazole.

A solution of 1.83 g. (0.01 mole) of 1-allyl-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-allyl-5-nitroimidazol-2-ylmethyl phenyl carbonate is separated by filtration.

A solution of 606 mg. (0.002 mole) of 1-allyl-5-nitroimidazol-2-ylmethyl phenyl carbonate in 10 ml. of chloroform, cooled in an ice-bath, is saturated with dry ammonia. The mixture is allowed to stand for 1 day at 5° C. 1-allyl-5-nitroimidazol-2-ylmethyl carbamate is obtained crystalline after evaporating the solvent and washing the residue with water.

EXAMPLE 13

1-(2'-acetoxyethyl)-5-nitroimidazol-2-ylmethyl carbamate and 1 - (2' - hydroxyethyl)-5-nitroimidazol-2-ylmethyl carbamate A mixture of 24.25 g. of 1-(2'-acetoxyethyl)-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-acetoxyethyl)-2-hydroxymethyl-5-nitroimidazole; M.P. 138–145° C.

A solution of 1.4 g. of 1-(2'-acetoxyethyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-acetoxyethyl)-5-nitroimidazol-2-ylmethyl phenyl carbonate, M.P. 93–95° C., is separated by filtration.

1.5 g. of 1-(2'-acetoxyethyl)-5-nitroimidazol-2-ylmethyl phenyl carbonate is dissolved slowly in 50 ml. of liquid ammonia. After solution is complete, the ammonia is permitted to evaporate and the residue washed with ethanol and recrystallized to yield 1-(2'-acetoxyethyl)-5-nitroimidazol-2-ylmethyl carbamate; M.P. 160–162° C.

6 g. of 1-(2'-acetoxyethyl)-5-nitroimidazol-2- ylmethyl carbamate is dissolved in 100 ml. of ethanol and the solution saturated with ammonia. The mixture is allowed to stand for 12 hours at 15° C. and the solvent removed by evaporation under reduced pressure. The residue is washed with methanol to yield 1-(2'-hydroxyethyl)-5-nitroimidazol-2-ylmethyl carbamate; M.P. 150–152° C.

EXAMPLE 14

1-(2'-hydroxypropyl)-5-nitroimidazol-2-ylmethyl carbamate

A mixture of 21.3 g. (0.1 mole) of 1-(2'-acetoxypropyl)-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yield 1-(2'-acetoxypropyl) - 2 - hydroxymethyl-5-nitroimidazole; M.P. 150–155° C.

A solution of 2.43 g. (0.01 mole) of 1-(2'-acetoxypropyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1,2'-acetoxypropyl)-5-nitroimidazol-2-ylmethyl phenyl carbonate is separated by filtration.

A solution of 726 mg. (0.002 mole) of 1-(2'-acetoxypropyl)-5-nitroimidazol-2-ylmethyl phenyl carbonate in 10 ml. of chloroform, cooled in an ice-bath, is saturated with dry ammonia. It is allowed to stand for 5 days at 5° C. 1-(2' - acetoxypropyl) - 5 - nitroimidazol-2-yl-methyl carbamate is obtained crystalline, M.P. 106–108° C., after evaporating the solvent and washing the residue with water.

The 1-(2'-acetoxypropyl) - 5 - nitroimidazol-2-yl-methyl carbamate produced as above is redissolved in methanol and the solution saturated with anhydrous ammonia. The mixture is allowed to stand for 2 days at 15° C. and concentrated under reduced pressure. The residue is recrystallized from ethyl acetate, ethyl alcohol or a mixture of the two, to yields 1-(2'-hydroxypropyl)-5-nitroimidazol-2-ylmethyl carbamate.

In accordance with the above procedure, but starting with 1-(2'-acetoxybutyl)-5-nitroimidazole,
1-(2'-acetoxypentyl)-5-nitroimidazole,
1-(3'-acetoxybutyl)-5-nitro-imidazole,
1-(3'-acetoxypentyl)-5-nitroimidazole and
1-(3'-acetoxypropyl)-5-nitroimidazole, in place of 1-(2'-acetoxypropyl)-5-nitroimidazole, there is obtained the corresponding 1-(2'-hydroxybutyl)-5-nitroimidazol-2-ylmethyl carbamate,
1-(2'-hydroxypentyl)-5-nitroimidazol-2-ylmethyl carbamate,
1-(3'-hydroxybutyl)-5-nitroimidazol-2-ylmethyl carbamate,
1-(3'-hydroxypentyl)-5-nitroimidazol-2-ylmethyl carbamate and
1-(3'-hydroxypropyl)-5-nitroimidazol-2-ylmethyl carbamate, and the corresponding 1-(acetoxyalkyl)-5-nitroimidazol-2-ylmethyl carbamate analogs thereof.

In accordance with the above procedure, but using the propionoxy, butyroxy or valeroxy analogs of any of the aforementioned 1-hydroxyalkyl-5-nitroimidazoles as starting materials in place of the 1-acetoxyalkyl-5-nitroimidazoles utilized above, there are obtained the corresponding 1-alkanoyloxyalkyl-5-nitroimidazol-2-ylmethyl carbamates and 1-hydroxyalkyl - 5 - nitroimidazol-2-ylmethyl carbamates.

EXAMPLE 15

1-(2'-ethoxyethyl)-5-nitroimidazol-2-ylmethyl carbamate

A mixture of 9.2 g. (0.05 mole) of 1-(2'-ethoxyethyl)-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethoxyethyl)-2-hydroxymethyl-5-nitroimidazole.

A solution of 1.99 g. (0.01 mole) of 1-(2'-ethoxyethyl)-2-hydroxymethyl-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(2'-ethoxyethyl)-5-nitroimidazol-2-ylmethyl phenyl carbonate is separated by filtration.

3.19 g. of 1-(2' - ethoxyethyl) - 5 - nitroimidazol - 2-ylmethyl phenyl carbonate is dissolved slowly in 50 ml. of liquid ammonia. After solution is complete, the ammonia is permitted to evaporate. The residue is washed with ethanol and recrystallized from methanol to yield 1-(2'-ethoxyethyl-5-nitroimidazol-2-ylmethyl carbamate.

In accordance with the above procedure, but starting with 1-(2'-methoxyethyl)-5-nitroimidazole,
1-(2'-propoxyethyl)-5-nitroimidazole,
1-(2'-butoxyethyl)-5-nitroimidazole,
1-(2'-benzyloxyethyl)-5-nitroimidazole,
1-(2'-ethoxypropyl)-5-nitroimidazole,
1-(2'-ethoxybutyl)-5-nitroimidazole, and
1-(2'-ethoxypentyl)-5-nitroimidazole, in place of 1-(2'-ethoxyethyl)-5-nitroimidazole, there is obtained the corresponding 1-(2'-methoxyethyl)-5-nitroimidazol-2-ylmethyl carbamate,
1-(2'-propoxyethyl)-5-nitroimidazol-2-ylmethyl carbamate,
1-(2'-butoxyethyl)-5-nitroimidazol-2-ylmethyl carbamate,
1-(2'-benzyloxyethyl)-5-nitroimidazol-2-ylmethyl carbamate,
1-(2'-ethoxypropyl)-5-nitroimidazol-2-ylmethyl carbamate,
1-(2'-ethoxybutyl)-5-nitroimidazol-2-ylmethyl carbamate, and
1-(2'-ethoxypentyl)-5-nitroimidazole-2-ylmethyl carbamate.

EXAMPLE 16

Ethyl 2-carbamoyloxymethyl-5-nitroimidazol-1-ylacetate

A mixture of 0.1 mole of ethyl-5-nitroimidazol-1-yl-acetate, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields ethyl 2-hydroxymetthyl-5-nitroimidazol-1-ylacetate.

A solution of 0.01 mole of ethyl 2-hydroxymethyl-5-nitroimidazol-1-ylacetate in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of ethyl 2-phenoxycarbonyloxymethyl-5-nitroimidazol-1-ylacetate, M.P. 106–108° C., is separated by filtration.

2.0 g. of ethyl 2-phenoxycarbonyloxymethyl-5-nitroimidazol-1-ylacetate is dissolved slowly in 20 ml. of liquid ammonia. After solution is complete, the ammonia is permitted to evaporate and the residue washed with ethanol and recrystallized from methanol to yield ethyl 2-carbamoyloxymethyl-5-nitroimidazol-1-ylacetate.

In accordance with the above procedure but starting with methyl-5-nitroimidazol-1-yl acetate,
propyl-5-nitroimidazol-1-yl acetate,
butyl-5-nitroimidazol-1-yl acetate,
ethyl-5-nitroimidazol-1-yl propionate,
methyl-5-nitroimidazol-1-yl propionate,
propyl-5-nitroimidazol-1-yl propionate, and
butyl-5-nitroimidazol-1-yl-propionate, in place of ethyl-5-nitroimidazol-1-yl acetate, there is obtained the corresponding methyl-2-carbamoylmethyl-5-nitroimidazol-1-yl acetate,
propyl-2-carbamoylmethyl-5-nitroimidazol-1-yl acetate,
butyl-2-carbamoylmethyl-5-nitroimidazol-1-yl acetate,
ethyl-2-carbamoylmethyl-5-nitroimidazol-1-yl propionate,
methyl-2-carbamoylmethyl-5-nitroimidazol-1-yl propionate,
propyl-2-carbamoylmethyl-5-nitroimidazol-1-yl propionate, and
butyl-2-carbamoylmethyl-5-nitroimidazol-1-yl propionate.

EXAMPLE 17

1-(2'-N-morpholinoethyl)-5-nitroimidazol-2-ylmethyl carbamate

A mixture of 21.4 g. (0.1 mole) of 1-(2'-N-morpholinoethyl)-5-nitroimidazole, 15 g. (0.5 mole) of paraformaldehyde and 150 ml. of dimethylsulfoxide is heated in a sealed tube overnight at 110–150° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-N-morpholinoethyl)-5-nitroimidazol-2-ylmethanol.

A solution of 2.44 g. (0.01 mole) of 1-(2'-N-morpholinoethyl)-5-nitroimidazol-2-ylmethanol in 25 ml. of dry pyridine is stirred at 0° C. and 1.85 g. (0.012 mole) of phenyl chloroformate is slowly added. The reaction mixture is stirred for 3–4 hours at room temeprature and is poured into about 200 ml. of water. The mixture is cooled overnight and the precipitate of 1-(2'-N-morpholinoethyl)-5 - nitroimidazol-2-ylmethyl phenyl carbonate is separated by filtration.

0.05 mole of 1-(2'-N-morpholinoethyl)-5-nitroimidazol-2-ylmethyl phenyl carbonate is dissolved slowly in 50 ml. of liquid ammonia. After solution is complete, the ammonia is permitted to evaporate and the residue washed with ethanol and recrystallized from methanol to yield 1-(2'-N-morpholinoethyl)-5-nitroimidazol-2-ylmethyl carbamate.

In accordance with the above procedure, but starting with 1-(2'-N-pyrrolidinoethyl)-5-nitroimidazole,
1-(2'-N-piperidinoethyl)-5-nitroimidazole,
1-(2'-N,N-dimethylaminoethyl)-5-nitroimidazole,
1-(2'-N,N-diethylaminoethyl)-5-nitroimidazole, in place of 1-(2'-morpholinoethyl)-5-nitroimidazole, there is obtained the corresponding 1-(2'-N-pyrrolidinoethyl)-5-nitroimidazol-2-ylmethyl carbonate,
1-(2'-N,N-piperidinoethyl)-5-nitroimidazol-2-ylmethyl carbamate,
1-(2'-N,N-dimethylaminoethyl)-5-nitroimidazol-2-ylmethyl carbamate, and
1-(2'-N,N-diethylaminoethyl)-5-nitroimidazol-2-ylmethyl carbamate.

EXAMPLE 18

1-(2'-ethylthioethyl)-5-nitroimidazol-2-ylmethyl N-methylcarbamate

A mixture of 1.08 g. (0.005 mole) of 1-(2'-ethylthioethyl)-5-nitroimidazole, 0.5 g. (0.015 mole) of paraformaldehyde and 5 ml. of dimethylsulfoxide is heated in a sealed tube overnight at 120° C. The dimethylsulfoxide is removed completely at reduced pressure, and the residue is slurried in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethylthioethyl)-2-hydroxymethyl-5-nitroimidazole.

A mixture of 246 mg. (0.001 mole) of 1-(2'-ethylthioethyl)-2-hydroxymethyl-5-nitroimidazole, 68 mg. (0.0012 mole) of methyl isocyanate, and 120 mg. (0.0012 mole) of triethylamine in 20 ml. of 1,2-dimethoxyethane is refluxed overnight. The solvent is concentrated to a small volume, a little hexane added, and the solid that separates is removed by filtration. The 1-(2'-ethylthioethyl)-5-nitroimidazol-2-ylmethyl N-methylcarbamate is recrystallized from a mixture of alcohol and water.

In accordance with the above procedure, but starting with 1-(3'-ethylthiopropyl)-5-nitroimidazole,
1-(4'-ethylthiobutyl)-5-nitroimidazole,
1-(2'-methylthioethyl)-5-nitroimidazole,
1-(2'-propylthioethyl)-5-nitroimidazole,
1-(2'-phenylthioethyl)-5-nitroimidazole, and
1-(2'-benzylthioethyl)-5-nitroimidazole, in place of 1-(2'-ethylthioethyl)-5-nitroimidazole, there is obtained the corresponding 1-(3'-ethylthiopropyl)-5-nitroimidazol-2-ylmethyl N-methylcarbamate,
1-(4'-ethylthiobutyl)-5-nitroimidazol-2-yl-methyl N-methylcarbamate,
1-(2'-methylthioethyl)-5-nitroimidazol-2-ylmethyl N-methylcarbamate,
1-(2'-propylthioethyl)-5-nitroimidazol-2-ylmethyl N-methylcarbamate,
1-(2'-phenylthioethyl)-5-nitroimidazol-2-ylmethyl N-methylcarbamate, and
1-(2'-benzylthioethyl)-5-nitroimidazol-2-ylmethyl N-methylcarbamate.

EXAMPLE 19

1-(2'-ethylsulfinylethyl)-5-nitroimidazol-2-ylmethyl N-methylcarbamate

A mixture of 1.08 g. (0.005 mole) of 1-(2'-ethylsulfinylethyl) - 5 - nitroimidazole, .5 g. (0.015 mole) of paraformaldehyde and 5 ml. of dimethylsulfoxide is heated in a sealed tube overnight at 120° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethylsulfinylethyl)-5-nitroimidazol-2-ylmethanol.

A mixture of 246 mg. (0.001 mole) of 1-(2'-ethylsulfinylethyl) - 5 - nitroimidazol - 2 - ylmethanol, 68 mg. (0.0012 mole) of methyl isocyanate, and 120 mg. (0.0012 mole) of triethylamine in 20 ml. of 1,2-dimethoxyethane is refluxed overnight. The solvent is concentrated to a small volume, a little hexane is added, and the material that separates is removed by filtration. The 1-(2'-ethylsulfinylethyl) - 5 - nitroimidazol - 2 - ylmethyl N-methylcarbamate is recrystallized from a mixture of alcohol and water.

In accordance with the above procedure, but starting with 1-(3'-ethylsulfinylpropyl)-5-nitroimidazole,
1-(4'-ethylsulfinylbutyl)-5-nitroimidazole,
1-(2'-methylsulfinylethyl)-5-nitroimidazole,
1-(2'-propylsulfinylethyl)-5-nitroimidazole,
1-(2'-phenylsulfinylethyl)-5-nitroimidazole, and
1-(2'-benzylsulfinylethyl)-5-nitroimidazole, in place of 1-(2'-ethylsulfinylethyl)-5-nitroimidazole, there is obtained the corresponding 1-(3'-ethylsulfinylpropyl)-5-nitroimidazol-2-ylmethyl N-methylcarbamate,
1-(4'-ethylsulfinylbutyl)-5-nitroimidazol-2-ylmethyl N-methylcarbamate, 1-(2'-methylsulfinylethyl)-5-nitroimidazol-2-ylmethyl N-methylcarbamate,
1-(2'-propylsulfinylethyl)-5-nitroimidazol-2-ylmethyl N-methylcarbamate,
1-(2'-phenylsulfinylethyl)-5-nitroimidazol-2-ylmethyl N-methylcarbamate, and
1-(2'-benzylsulfinylethyl)-5-nitroimidazol-2-ylmethyl N-methylcarbamate.

EXAMPLE 20

1-(2'-ethylsulfonylethyl)-5-nitroimidazol-2-ylmethyl N-methylcarbamate

A mixture of 1.08 g. (0.005 mole) of 1-(2'-ethylsulfonylethyl) - 5 - nitroimidazole, .5 g. (0.015 mole) of paraformaldehyde and 5 ml. of dimethylsulfoxide is heated in a sealed tube overnight at 120° C. The dimethylsulfoxide is removed completely at reduced pressure, and the residue is dissolved in water and extracted with chloroform. The chloroform extract is dried and concentrated. The residue is dissolved in ethyl acetate, and the solution is charged on a column of alumina. Elution with ethyl acetate and evaporation of the solvent yields 1-(2'-ethylsulfonylethyl) - 5 - nitroimidazol-2-ylmethanol.

A mixture of 246 mg. (0.001 mole) of 1-(2'-ethylsulfonylethyl) - 5 - nitroimidazol - 2 - ylmethanol, 68 mg. (0.0012 mole) of methyl isocyanate, and 120 mg. (0.0012 mole) of triethylamine in 20 ml. of 1,2-dimethoxyethane is refluxed overnight. The solvent is concentrated to a small volume, a little hexane added, and the material that separates is removed by filtration. The 1-(2' - ethylsulfonylethyl) - 5 - nitroimidazol-2-ylmethyl N-methylcarbamate is recrystallized from a mixture of alcohol and water.

In accordance with the above procedure, but starting with 1-(3'-ethylsulfonylpropyl)-5-nitroimidazole,
1-(4'-ethylsulfonylbutyl)-5-nitroimidazole,
1-(2'-methylsulfonylethyl)-5-nitroimidazole,
1-(2'-propylsulfonylethyl)-5-nitroimidazole,
1-(2'-phenylsulfonylethyl)-5-nitroimidazole, and
1-(2'-benzylsulfonylethyl)-5-nitroimidazole, in place of 1-(2'-ethylsulfonylethyl) - 5 - nitroimidazole, there is obtained the corresponding 1-(3'-ethylsulfonylpropyl)-5-nitroimidazol-2-ylmethyl N-methylcarbamate,
1-(4'-ethylsulfonylbutyl)-5-nitroimidazol-2-ylmethyl N-methylcarbamate,
1-(2'-methylsulfonylethyl)-5-nitroimidazol-2-ylmethyl N-methylcarbamate,
1-(2'-propylsulfonylethyl)-5-nitroimidazol-2-ylmethyl N-methylcarbamate,
1-(2'-phenylsulfonylethyl)-5-nitroimidazol-2-ylmethyl N-methylcarbamate, and
1-(2'-benzylsulfonylethyl)-5-nitroimidazol-2-ylmethyl N-methylcarbamate.

EXAMPLE 21

1-(1'-methyl-5'-nitroimidazol-2'-yl)ethyl carbamate

A solution of 0.01 mole of 1-methyl-2-(1'-hydroxyethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 1-(1'-methyl-5'-nitroimidazol-2'-yl)ethyl phenyl carbonate is separated by filtration.

A solution of 0.005 mole of 1-(1'-methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 1-(1'-methyl - 5' - nitroimidazol-2'-yl)ethyl carbamate, M.P. 156.5–160° C., is obtained as a crystalline precipitate.

EXAMPLE 22

2-(1'-methyl-5'-nitroimidazol-2'-yl)ethyl carbamate

A solution of 0.01 mole of 1-methyl-2'-hydroxyethyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 2-(1'-methyl-5'-nitroimidazol-2'-yl)ethyl phenyl carbonate is separated by filtration.

A solution of 0.005 mole of 2-(1'-methyl-5'-nitroimidazol-2'-yl)ethyl phenyl carbonate in 10 ml. of chloroform is cooled in an ice-bath, and is saturated with dry ammonia. It is allowed to stand for 5 days at 5° C. 2-(1'-methyl-5'-nitroimidazol-2'-yl)ethyl carbamate is obtained as a crystalline precipitate; M.P. 165–166° C.

EXAMPLE 23

3-(1'-methyl-5'-nitroimidazol-2'-yl)prop-2-en-1-yl carbamate

A solution of 0.01 mole of 1-methyl-2-(3'-hydroxyprop-2'-enyl)-5-nitroimidazole in 25 ml. of dry pyridine is stirred at 0° C. and 1.85 g. (0.012 mole) of phenyl chloroformate is slowly added. The reaction mixture is stirred for 3–4 hours at room temperature and is poured into about 200 ml. of water. The mixture is cooled overnight and the precipitate of 3-(1'-methyl-5'-nitroimidazol-2'-yl)prop-2-en-1-yl phenyl carbonate is separated by filtration.

A solution of 0.005 mole of 3-(1'-methyl-5'-nitroimidazol-2'-yl)prop-2-en-1-yl phenyl carbonate in 10 ml. of chloroform is cooled in an ice-bath, and is saturated with dry ammonia. It is allowed to stand for 5 days at 5° C. 3-(1'-methyl-5'-nitroimidazol-2'-yl)prop-2-en-1-yl carbamate is obtained as a crystalline precipitate; M.P. 173–175° C.

EXAMPLE 24

1-methyl-5-nitroimidazol-2-ylmethyl N-methylcarbamate 2.77 g. (0.01 mole), of 1-methyl-5-nitroimidazol-2-ylmethyl phenylcarbonate is dissolved in 20 ml. of chloroform and 0.93 g. (0.03 mole) of methylamine in 20 ml. of chloroform is added at room temperature under a Dry Ice-cold finger. The mixture is stirred for 7 hours. The solvent is evaporated and the residue slurried with 15 ml. of water. The solid product removed by filtration. Recrystallization from water yields 1-methyl-5-nitroimidazol-2-ylmethyl N-methylcarbamate; M.P. 99–101° C.

In accordance with the above procedure, but using ethylamine, propylamine, butylamine, pentylamine and hexylamine in place of methylamine, and using the liquid amines directly rather than in chloroform solution, there is obtained the corresponding 1-methyl-5-nitroimidazol-2-ylmethyl N-ethylcarbamate,
1-methyl-5-nitroimidazol-2-yl-methyl N-propylcarbamate,
1-methyl-5-nitroimidazol-2-ylmethyl N-butylcarbamate,
1-methyl-5-nitroimidazol-2-ylmethyl N-pentylcarbamate and
1-methyl-5-nitroimidazol-2-ylmethyl N-hexylcarbamate.

EXAMPLE 25

1-methyl-5-nitroimidazol-2-ylmethyl N,N-dimethylcarbamate 7.8 g. of dimethylamine is added to a solution of 1-methyl-5-nitroimidazol-2-ylmethyl chloroformate (prepared from 11.0 g. of 1-methyl-2-hydroxymethyl-5-nitroimidazole as described in Example 1). The temperature of the reaction mixture rises to about 24° C. The mixture is stirred with cooling for one hour and then evaporated to dryness under reduced pressure. 100 ml. of water and 800 ml. of ethyl acetate are added to the residue. The ethyl acetate layer is separated and the aqueous layer extracted with two 200 ml. portions of ethyl acetate. The ethyl acetate extracts are combined and evaporated to dryness. On addition of 10 ml. of ethyl acetate to the residue, 1-methyl-5-nitroimidazol-2-ylmethyl N,N,-dimethylcarbamate crystallizes and is recovered by filtration to give 5.3 g.; M.P. 91–94° C. Recrystallization from a benzene-hexane mixture yields substantially pure material; M.P. 92–94° C.

In accordance with the above procedure, but using diethylamine, dipropylamine and diphenylamine, in place of dimethylamine, there is obtained the corresponding 1-methyl-5-nitroimidazol-2-ylmethyl N,N-diethylcarbamate, 1-methyl-5-nitroimidazol-2-ylmethyl N,N-dipropylcarbamate, 1-methyl-5-nitroimidazol-2-ylmethyl N,N,-diphenylcarbamate.

EXAMPLE 26

1-methyl-5-nitroimidazol-2-ylmethyl 4-morpholinecarboxylate

A cold solution of the chloroformate ester of 1-methyl-2-hydroxymethyl-5-nitroimidazole is prepared as in Example 1 (using 11.0 g. of 1-methyl-2-hydroxymethyl-5-nitroimidazole). To this solution there is added rapidly with stirring 15.6 g. of morpholine. The temperature rises from 0° C. to 15° C. The reaction mixture is cooled in an ice-bath and stirred for one hour. The tetrahydrofuran is evaporated under reduced pressure and the gummy residue extracted with a mixture of 100 ml. of water and 1 liter of ethyl acetate. The ethyl acetate layer is separated, back-washed with 100 ml. of water and then evaporated to dryness. The resulting residue is dissolved in a minimum volume of benzene. The benzene solution is concentrated to a volume of about 20 ml. An equal volume of diethyl ether is added to the benzene. 1-methyl-5-nitroimidazol-2-ylmethyl 4-morpholinecarboxylate precipitates. There is obtained 7.3 g. of crude product which is recrystallized three times from benzene to give substantially pure material; M.P. 108–110° C.

In accordance with the above procedure, but starting with pyrrolidine, piperidine, N-methyl piperazine, and thiamorpholine, in place of morpholine, there is obtained the corresponding 1-methyl-5-nitroimidazol-2-ylmethyl 1-pyrrolidinecarboxylate,
1-methyl-5-nitroimidazol-2-ylmethyl 1-piperidinecarboxylate,
1-methyl-5-nitroimidazol-2-ylmethyl $N^1$-methyl-N4-piperazinecarboxylate, and
1-methyl-5-nitroimidazol-2-ylmethyl-4-thiamorpholinecarboxylate.

EXAMPLE 27

1-methyl-5-nitroimidazol-2-ylmethyl N-chloroethylcarbamate

A cold solution of the chloroformate ester of 1-methyl-2-hydroxymethyl-5-nitroimidazole is prepared as in Example 1 using 11.0 g. of 1-methyl-2-hydroxymethyl-5-nitroimidazole. To this solution is added 14.4 g. of 2-chloroethylamine. The mixture is stirred with cooling for one hour and then evaporated to dryness under reduced pressure. 100 ml. water and 800 ml. of ethyl acetate are added to the residue. The ethyl acetate layer is separated and the aqueous layer extracted with two 200 ml. portions of ethyl acetate. The ethyl acetate extracts are combined and evaporated to dryness. On addition of ethyl acetate and to the residue, 1-methyl-5-nitroimidazol-2-ylmethyl N-2′-chloroethylcarbamate crystallizes.

In accordance with the above procedure, but starting with 2-bromoethylamine, 2,2,2-trifluoroethylamine, 2-fluoroethylamine, 3-chloropropylamine, and 3-bromopropylamine, in place of 2-chloroethylamine, there is obtained the corresponding 1-methyl-5-nitroimidazol-2-ylmethyl N-2′-bromoethylcarbamate,
1-methyl-5-nitroimidazol-2-ylmethyl N-2′,2′,2′-trifluoroethylcarbamate,
1-methyl-5-nitroimidazol-2-ylmethyl N-2′-fluoroethylcarbamate,
1-methyl-5-nitroimidazol-2-ylmethyl N-3′-chloropropl-carbamate and
1-methyl-5-nitroimidazol-2-ylmethyl N-3′-bromopropylcarbamate.

EXAMPLE 28

1-methyl-5-nitroimidazol-2-ylmethyl hydroxymethylcarbamate

A mixture of 2.0 g. (0.01 mole) 1-methyl-5-nitroimidazol-2-ylmethylcarbamate, 0.6 g. (0.02 mole) of paraformaldehyde and 6 ml. of dimethyl sulfoxide is heated at 100° C. in a sealed tube for 24 hours. Evaporation of the solvent leaves a viscous residue which is dissolved in 3 ml. of dimethyl formamide. After the addition of 5 ml. of water and standing for 24 hours, a crystalline precipitate is obtained which is separated by filtration, air dried, and recrystallized from ethyl acetate to yield 1-methyl-5-nitroimidazol-2-methyl N-hydroxymethylcarbamate.

EXAMPLE 29

1-methyl-5-nitroimidazol-2-ylmethyl 2′,2′,2′-trichloro-1′-hydroxyethylcarbamate 1.7 g. (0.011 mole), of 2′,2′,2′-trichloro-1′-hydroxyethylisocyanate is dissolved in 50 ml. of dioxane and a solution of 1.57 g. (0.01 mole) of 1-methyl-2-hydroxymethyl-5-nitroimidazole in 200 ml. of dioxane is added. The mixture is left to stand for 48 hours at 15° C. The solution is concentrated to 25 ml. and the crystalline residue removed by filtration. The residue is recrystallized from ethyl acetate to yield 1-methyl-5-nitrimidazol-2-ylmethyl 2′,2′,2′-trichloro-1′-hydroxyethylcarabamate.

EXAMPLE 30

1-methyl-5-nitroimidazol-2-ylmethyl N-(2′,2′,2′-trichloro-1′-hydroxyethoxy)carbamate A mixture of 2.16 g. (0.01 mole) of 1-methyl-5-nitroimidazol-2-ylmethyl N-hydroxycarbamate, 1.81 g. (0.011 mole) chloral hydrate and 2.00 g. of anhydrous magnesium sulfate are heated at reflux for 8 hours. The reaction mixture after cooling is filtered and the filtrate evaporated to dryness to yield 1-methyl-5-nitroimidazol-2-ylmethyl N-(2′,2′,2′-trichloro-1′-hydroxyethoxycarbamate.

In accordance with the above procedure, but starting with bromal hydrate or trifluoro acetaldehyde hydrate, in place of chlorohydrate, there is obtained the corresponding 1-methyl-5-nitroimidazol-2-ylmethyl N-(2′,2′,2′-tribromo-1′-hydroxyethoxy)carbamate, and 1-methyl-5-nitroimidazol-2-ylmethyl N-(2′,2′,2′-trifluoro-1′-hydroxyethoxy)carbamate.

EXAMPLE 31

1-methyl-5-nitroimidazol-2-ylmethyl N-2′-hydroxy ethylcarbamate 1.22 g. of ethanolamine is added at 15° C. to a solution of 2.93 g. of 1-methyl-5-nitroimidazol-2-ylmethyl phenylcarbonate in 10 ml. of chloroform. The mixture is stirred for 7 hours and at the end of this time, the solid product is removed by filtration. Recrystallized from ethyl acetate gives 1-methyl-5-nitroimidazol-2-ylmethyl N-2′-hydroxyethyl carbamate; M.P. 132–135° C.

In accordance with the above procedure, but starting with propanolamine, butanolamine, in place of ethanolamine, there is obtained the corresponding 1-methyl-5-nitroimidazol-2-ylmethyl N-3′-hydroxypropylcarbamate, and 1-methyl-5-nitroimidazol-2-ylmethyl N-hydroxybutylcarbamate.

EXAMPLE 32

1-methyl-5-nitroimidazol-2-ylmethyl ethoxymethylcarbamate

A mixture of 1.15 g. (.005 mole) of 1-methyl-5-nitroimidazol-2-ylmethyl hydroxymethylcarbamate, .05 g. of p-toluenesulfonic acid and 20 ml. of ethanol is allowed to stir overnight at room temperature. After evaporation, the residue is dissolved in 50 ml. of chloroform and the chloroform solution washed with dilute sodium bicarbonate solution. The chloroform solution, after drying over sodium sulfate, is evaporated to dryness. The residue is recrystallized from ethyl acetate to yield 1-methyl-5-nitroimidazol-2-ylmethyl N-ethoxymethylcarbamate.

In accordance with the above procedure, but using n-propanol, n-butanol or n-pentanol in place of ethanol, there is obtained the corresponding 1-methyl-5-nitroimidazol-2-ylmethyl N-propoxymethylcarbamate, 1-methyl-5-nitroimidazol-2-ylmethyl N-butoxymethylcarbamate, and 1-methyl - 5 - nitroimidazol-2-ylmethyl N-pentoxymethylcarbamate.

EXAMPLE 33

1-methyl-5-nitroimidazol-2-ylmethyl N-ethoxyethylcarbamate 1.78 g. (0.02 mole) of 2-ethoxyethylamine is added at 15° C. to a solution of 2.93 g. of 1-methyl-5-nitroimidazol-2-ylmethyl phenylcarbonate in 10 ml. of chloroform. The mixture is stirred for 7 hours and at the end of this time, the solution is evaporated to dryness. The residue is slurried with water and the solid product after filtration, is recrystallized from ethanol-water to give 1-methyl - 5 - nitroimidazol-2-ylmethyl N-ethoxyethylcarbamate.

In accordance with the above procedure, but starting with 3-ethoxypropylamine, 4-ethoxybutylamine, 5-ethoxypentylamine, and 6-ethoxyhexylamine, in place of 2-ethoxyethylamine, there is obtained the corresponding 1-methyl-5-nitroimidazol-2-ylmethyl N-3-ethoxypropyl-carbamate, 1-methyl-5-nitroimidazol-2-ylmethyl N-4-ethoxybutyl-carbamate, 1-methyl-5-nitroimidazol-2-ylmethyl N-5-ethoxypentyl-carbamate, and 1-methyl-5-nitroimidazol-2-ylmethyl N-6-ethoxyhexyl-carbamate.

EXAMPLE 34

1-methyl-5-nitroimidazol-2-ylmethyl N-(aminoethyl) carbamate 15.5 g. (0.02 mole) of 1-methyl-5-nitroimidazol-2-methyl phenylcarbonate is dissolved in 70 ml. of chloroform and 0.06 mole of ethylene diamine is added. The mixture is heated under reflux for 5 hours, cooled and allowed to stand for 18 hours. 170 ml. of chloroform is added and the mixture extracted with saturated aqueous potassium bicarbonate solution. The chloroform extract is washed with water and the solvent removed under reduced pressure. A portion (0.1 g.) of the residual brown oil is dissolved in methyl ethyl ketone. A solution of 8.53 g. of p-toluenesulfonic acid in 80 ml. of methylethyl ketone is prepared. An excess of the p-toluenesulfonic acid solution (i.e. more than 2 moles per mole of concentrate derivative) is added and the mixture allowed to cool. The solution is evaporated to dryness, 5 ml. of methylethyl ketone added. After standing at 0° C. the di-p-toluenesulfonic acid salt of 1-methyl-5-nitroimidazol-2-ylmethyl N-(aminoethyl)carbamate is obtained.

EXAMPLE 35

1-methyl-5-nitroimidazol-2-ylmethyl N-(N',N'-diethyl-aminoethyl)carbamate 15.5 g. (0.02 mole) of 1-methyl-5-nitroimidazol-2-methyl phenylcarbonate is dissolved in 70 ml. of chloroform and 2.68 g. (.023 mole) of diethylaminoethylamine is added. The mixture is heated under reflux for 5 hours, cooled and allowed to stand for 18 hours. Chloroform (170 ml.) is added and the mixture extracted with saturated aqueous potassium bicarbonate solution. The chloroform extract washed with water and the solvent removed under reduced pressure. A portion (0.1 g.) of the residual brown oil is dissolved in methylethyl ketone. A solution of 8.53 g. of p-toluenesulfonic acid in 80 ml. of methylethyl ketone is prepared. An excess of the p-toluenesulfonic acid solution (i.e. more than 2 moles per mole of carbonate derivative) and the mixture allowed to cool. The solution is evaporated to dryness, 5 ml. of methylethyl ketone added. After standing at 0° C. the di-p-toluenesulfonic acid salt of 1-methyl-5-nitroimidazol-2-ylmethyl N-(N',N'-diethylaminoethyl)carbamate, M.P. 101–103° C., is obtained.

In accordance with the above procedure, but starting wtih 3-dimethylaminopropylamine and dibenzylaminoethylamine, in place of diethylaminoethylamine, there is obtained the corresponding 1-methyl-5-nitroimidazol-2-ylmethyl N-(3'-N'-dimethylaminopropyl)carbamate, and 1-methyl - 5 - nitroimidazol-2-ylmethyl N-(N'-dibenzylaminoethyl)carbamate.

EXAMPLE 36

1-methyl-5-nitroimidazol-2-ylmethyl N-(morpholin-4'-yl methyl)carbamate 12.0 g. (0.01 mole) of 1-methyl-5-nitroimidazol-2-ylmethyl carbamate, 0.3 g. (0.01 mole) of paraformaldehyde, and 0.86 g. (0.01 mole) of morpholine in 6 ml. of dimethyl formamide is heated at 100° C. in a sealed tube for 24 hours. After evaporation of the solvent under reduced pressure, the residue is dissolved in 20 ml. of methylethyl ketone. A solution of 3.4 g. of p-toluenesulfonic acid in 20 ml. of methylethyl ketone is added to yield a precipitate of the di-p-toluenesulfonic acid salt of 1-methyl-5-nitroimidazol-2-ylmethyl N-(morpholin-4'-ylmethyl)carbamate.

In accordance with the above procedure, but starting with N-methylpiperazine, pyrrolidine and thiamorpholine, in place of morpholine, there is obtained the corresponding di-p-toluenesulfonic acid salt of 1-methyl-5-nitroimidazol-2-ylmethyl N-(4-methylpiperazin-1-ylmethyl)carbamate, 1-methyl-5-nitroimidazol-2-ylmethyl N-(pyrrolidin-1-ylmethyl) carbamate, and 1-methyl-5-nitroimidazol-2-ylmethyl N-thiamorpholine-4'-ylmethyl)carbamate.

EXAMPLE 37

1-methyl-5-nitroimidazol-2-ylmethyl N-ethoxymethylenecarbamate 2.0 g. (0.01 mole) of 1-methyl-5-nitroimidazol-2-ylmethyl carbamate, 1.33 ml. (0.01 mole) of boron fluoride etherate and 25 ml. of triethylorthoformate is heated on a steam bath overnight. The excess triethylorthoformate is removed under vacuum. To the oily residue is added 100 ml. of chloroform and 10 ml. saturated sodium bicarbonate solution. The chloroform solution is separated, washed with 2×10 ml. of water, and dried over anhydrous sodium sulfate. Evaporation of the chloroform solution gives 1-methyl-5-nitroimidazol-2-ylmethyl N-ethoxymethylenecarbamate.

In accordance with the above procedure, but starting with trimethylorthoformate, tripropylorthoformate, tribenzylorthoformate, and triphenylorthoformate, in place of triethylorthoformate, there is obtained the corresponding 1-methyl-5-nitroimidazol-2-ylmethyl N-methoxymethyl-enecarbamate, 1-methyl-5-nitroimidazol-2-ylmethyl N-propoxymethyl-enecarbamate, 1-methyl-5-nitroimidazol-2-ylmethyl N-benzyloxy-
methylenecarbamate, and
1-methyl-5-nitroimidazol-2-ylmethyl N-phenyloxy-
methylenecarbamate.

EXAMPLE 38

1-methyl-5-nitroimidazol-2-ylmethyl N-(diethyl-
aminomethylene)carbamate

A mixture of 2.56 g. (0.01 mole) of 1-methyl-5-nitro-
imidazol-2-ylmethyl ethoxymethylenecarbamate, and 0.73 g. (0.01 mmole) of diethylamine in 25 ml. of 1,2-dimeth-
oxyethane is refluxed for 2 hours. After cooling, the addi-
tion of 3.44 g. (0.02 mole) of p-toluenesulfonic acid results
in the separation of the di-p-toluenesulfonate salt of 1-
methyl-5-nitroimidazol-2-ylmethyl N-(diethylaminometh-
ylene)carbamate.

In accordance with the above procedure, but starting
with dimethylamine, dibutylamine, dipropylaimne, di-
benzylamine, and diphenylamine, in place of diethyl-
amine, there is obtained the corresponding 1-methyl-5-nitroimidazol-2-ylmethyl N-dimethylamino-
methylenecarbamate,
1-methyl-5-nitroimidazol-2-ylmethyl N-dibutylamino-
methylenecarbamate,
1-methyl-5-nitroimidazol-2-ylmethyl N-dipropylamino-
methylenecarbamate,
1-methyl-5-nitroimidazol-2-ylmethyl N-dibenzylamino-
methylenecarbamate, and
1-methyl-5-nitroimidazol-2-yl-methyl N-diphenylamino-
methylenecarbamate.

EXAMPLE 39

1-methyl-5-nitroimidazol-2-ylmethyl formylcarbamate 3.28 g. (0.01 mole) of N-(1-methyl-5-nitroimidazol-
2-ylmethoxycarbonyl) N',N' - dimethylformamidinium
chloride hydrochloride is dissolved in 20 ml. of water
containing .84 g. of sodium bicarbonate. The solution is
allowed to stand overnight. The product is 1-methyl-5-
nitroimidazol-2-ylmethyl formylcarbamate. The same
compound is obtained on heating on a steam bath 1-meth-
yl-5-nitroimidazol-2-ylmethyl carbamate in an excess of
90% formic acid overnight.

EXAMPLE 40

1-methyl-5-nitroimidazol-2-ylmethyl N-acetylcarbamate 2 g. of 1-methyl-5-nitroimidazol-2-ylmethyl carbamate
is added to a mixture of 40 ml. of acetic anhydride and 4
drops of concentrated sulfuric acid. The solution is heated
for 18 hours on a steam bath. The solvent is removed
under reduced pressure and the residue triturated with
petroleum ether and the mixture filtered. The residue is
taken up in hot benzene, the mixture filtered and the fil-
trate concentrated under reduced pressure to a small vol-
ume. After standing at 5° C. for 12 hours, 1-methyl-5-
nitroimidazol-2-ylmethyl N-acetylcarbamate, M.P. 140–
142° C., is obtained on filtration.

In accordance with the above procedure, but using
propionic anhydride, butyric anhydride, or chloroacetic
anhydride, in place of acetic anhydride there is obtained
the corresponding 1-methyl-5-nitroimidazol-2-ylmethyl N-propionyl-
carbamate,
1-methyl-5-nitroimidazol-2-ylmethyl N-butyrylcarbamate,
and
1-methyl-5-nitroimidazol-2-ylmethyl N-chloroacetyl-
carbamate.

EXAMPLE 41

1-methyl-5-nitroimidazole-2-ylmethyl acetylcarbonate 5.9 g. of 1-methyl-2-hydroxymethyl-5-nitroimidazole
and about 0.5 ml. of pyridine are added to a solution of
acetyl isocyanate prepared by refluxing a solution of 15.9
g. oxalyl chloride, and 5.9 g. of acetamide in 300 ml. of 1,2-dichloroethane for 16 hours and the mixture refluxed
for 80 minutes. The solvent is then removed by concen-
tration in vacuo to give an oil which crystallizes on stand-
ing. The crystals are slurried with 50 ml. of benzene and
then recovered by filtration. Washing with a mixture of
50 ml. of benzene and 85 ml. of ether leaves crude 1-
methyl-5-nitroimidazol-2-ylmethyl acetylcarbamate; M.P.
108–132° C. On recrystallization from benzene-hexane,
substantially pure material is obtained; M.P. 132–135° C.

In accordance with the above procedure, but using
benzoylisocyanate or phenylacetylisocyanate, in place of
acetylisocyanate, there is obtained the corresponding 1-methyl-5-nitroimidazol-2-ylmethyl N-benzoyl
carbamate, and
1-methyl-5-nitroimidazol-2-ylmethyl N-phenylacetyl-
carbamate.

Similarly, in accordance with the above procedure, but
using 1-methyl-2-mercaptomethyl-5-nitroimidazole and 1-
ethyl - 2 - hydroxymethyl-5-nitroimidazole, in place of 1-
methyl - 2-hydroxymethyl-5-nitroimidazole and utilizing
benzoylisocyanate, there is obtained the corresponding 1-
methyl - 5-nitroimidazol-2-ylmethyl N-benzoylthiolcarba-
mate and 1-ethyl-5-nitroimidazole-2-ylmethyl N-benzoyl-
carbamate.

EXAMPLE 42

1-methyl-5-nitroimidazol-2-ylmethyl carbazate

A mixture of 5 g. of 1-methyl-5-nitroimidazol-2-yl-
methyl phenyl carbonate, 0.5 ml. of 95% hydrazine and
25 ml. of chloroform is stirred at room temperature for
one hour. At the end of this time the solid is removed by
filtration to give 3.8 g. of material; M.P. 101–105° C.
This product is dried in vacuo at 68° C. to remove phenol
and then recrystallized from water to give substantially
pure 1-methyl-5-nitroimidazol-2-ylmethyl carbazate; M.P.
135–140° C.

EXAMPLE 43

1-methyl-5-nitroimidazol-2-ylmethyl carbazate

To a solution of 1-methyl-2-hydroxymethyl-5-nitro-
imidazole chloroformate in dioxane as prepared in Exam-
ple 1, there is added dropwise .06 mole of anhydrous
hydrazine. The mixture is stirred for 90 minutes with cool-
ing in an ice bath. The mixture is evaporated under re-
duced pressure, and the residue washed with water and
dissolved in ethyl acetate. The ethyl acetate solution after
drying over sodium sulfate, is concentrated to yield 1-
methyl-5-nitroimidazol-2-ylmethyl carbazate.

EXAMPLE 44

1-methyl-5-nitroimidazol-2-ylmethyl N'-methylcarbazate

.05 mole of 1-methyl-5-nitroimidazol-2-ylmethyl chloro-
formate is dissolved in 50 ml. of anhydrous tetrahydro-
furan and added to a solution containing .15 mole of
methylhydrazine in 50 ml. of tetrahydrofuran at 15° C.
After 2 hours, the methylhydrazine hydrochloride is re-
moved by filtration. The tetrahydrofuran is removed under
reduced pressure and the residue is recrystallized from
ethyl acetate to yield 1-methyl-5-nitroimidazol-2-ylmethyl
N[1]-methylcarbazate.

In accordance with the above procedure, but starting
with ethylhydrazine, propylhydrazine, or benzylhydrazine,
in place of methylhydrazine, there is obtained the corre-
sponding 1-methyl-5-nitroimidazol-2-ylmethyl N[1]-ethylcarbazate,
1-methyl-5-nitroimidazol-2-ylmethyl N[1]-propylcarbazate,
and
1-methyl-5-nitroimidazol-2-ylmethyl N[1]-benzylcarbazate,

EXAMPLE 45

1-methyl-5-nitroimidazol-2-ylmethyl N²-isopropylidinylcarbazate 200 mg. of 1 - methyl-5-nitroimidazol-2-ylmethyl carbazate is dissolved in 3 ml. of acetone and heated under reflux for 10 minutes. The solvent is removed under reduced pressure and the residue recrystallized from a 1:1 mixture of benzene and hexane to yield 1-methyl-5-nitroimidazol - 2-ylmethyl N²-isopropylidenylcarbazate; M.P. 160–162° C.

In accordance with the above procedure, but using methylethyl ketone, benzaldehyde, acetaldehyde, in place of acetone, there is obtained the corresponding 1-methyl-5-nitroimidazol-2-ylmethyl N²-2″-butylidenylcarbazate,
1-methyl-5-nitroimidazol-2-ylmethyl N²-benzylidenylcarbazate, and
1-methyl-5-nitroimidazol-2-ylmethyl N²-ethylidenecarbazate.

EXAMPLE 46

1-methyl-5-nitroimidazol-2-ylmethyl N²-benzoylcarbazate

.1 mole of 1-methyl-5-nitroimidazol-2-ylmethyl carbazate is dissolved in 50 ml. of dry pyridine and cooled in ice. 0.1 mole of benzoyl chloride is added dropwise. After standing for 1 hour at 15° C., the solution is quenched with ice and water. The precipitated 1-methyl-5-nitroimidazol - 2 - ylmethyl N²-benzoylcarbazate is filtered, washed well with water and recrystallized from ethanol.

In accordance with the above procedure, but using acetic anhydride in place of benzoyl chloride, there is obtained the corresponding 1-methyl-5-nitroimidazol-2-ylmethyl N²-acetylcarbazate.

Similarly, but using propionic anhydride, valeric anhydride, butyric anhydride or phenylacetic anhydride, in place of acetic anhydride, there is obtained the corresponding 1-methyl-5-nitroimidazol-2-ylmethyl N²-propionylcarbazate,
1-methyl-5-nitroimidazol-2-ylmethyl N²-valerylcarbazate,
1-methyl-5-nitroimidazol-2-ylmethyl N²-butyrylcarbazate, and
1-methyl-5-nitroimidazol-2-ylmethyl N²-phenylacetylcarbazate.

EXAMPLE 47

1-methyl-5-nitroimidazol-2-ylmethyl N-hydroxycarbazate 0.386 g. of sodium is dissolved in 40 ml. of methanol and the solution cooled in an ice bath. 1.17 g. of hydroxylamine hydrochloride is added to the cold methanol solution. To the resulting mixture there is added over a period of 45 minutes 2.33 g. of 1-methyl-5-nitroimidazol-2-ylmethyl phenyl carbonate in 60 ml. of methanol. The resulting mixture is held for 15 hours at refrigerator temperature and at the end of this time, the solid material present is removed by filtration. The solid is washed with alcohol and then with hexane, and dried to give 1-methyl - 5-nitroimidazol-2-ylmethyl N-hydroxycarbamate; M.P. 189–190° C.

In accordance with the above procedure, but starting with

N-methylhydroxylamine hydrochloride,
N-propylhydroxylamine hydrochloride,
N-phenylhydroxylamine hydrochlorine, and
N-benzylhydroxylamine hydrochloride, in place of hydroxylamine, there is obtained the corresponding 1-methyl-5-nitroimidazol-2-ylmethyl N-methyl-N-hydroxycarbamate,
1-methyl-5-nitroimidazol-2-ylmethyl N′-propyl-N-hydroxycarbamate,
1-methyl-5-nitroimidazol-2-ylmethyl N-phenyl-N-hydroxycarbamate, and
1-methyl-5-nitroimidazol-2-ylmethyl N-benzyl-N-hydroxycarbamate.

EXAMPLE 48

1-(2′-acetoxyethyl)-5-nitroimidazol-2-ylmethyl N-hydroxy carbamate 3.66 g. of 1-(2′-acetoxyethyl)-5-nitroimidazol-2-ylmethyl phenyl carbonate is dissolved in 20 ml. of methanol and treated with freshly prepared hydroxylamine from .72 g. of hydroxylamine hydrochloride and .6 g. of sodium methoxide in 20 ml. of methanol. The residue is recrystallized from ethanol to yield 1-(2′-acetoxyethyl)-5-nitroimidazol-2-ylmethyl N-hydroxycarbamate; M.P. 153–155° C.

EXAMPLE 49

1-methyl-5-nitroimidazol-2-ylmethyl N-hydroxythioncarbamate 0.56 g. (0.005 mole) of potassium t-butoxide is dissolved in 20 ml. of ethanol and 0.35 g. (0.005 mole) of hydroxylamine hydrochloride is added and the mixture stirred for 5 minutes. 0.732 g. (0.0025 mole) of 1-methyl-5-nitroimidazol-2-ylmethyl phenyl thioncarbonate is added and the mixture allowed to stand for 1 hour. The solvent is removed under reduced pressure, and water added to the residue to yield 1-methyl-5-nitroimidazol-2-ylmethyl N-hydroxythioncarbamate; M.P. 94–95° C. (dec.).

In accordance with the above procedure, but starting with N-methylhydroxylamine, N-propylhydroxylamine, N-phenylhydroxylamine, and N-benzylhydroxylamine, in place of hydroxylamine, there is obtained the corresponding 1-methyl-5-nitroimidazol-2-ylmethyl N-methyl-N-hydroxythioncarbamate,
1-methyl-5-nitroimidazol-2-ylmethyl N-propyl-N-hydroxythioncarbamate, and
1-methyl-5-nitroimidazol-2-ylmethyl N′-benzyl-N′-hydroxythioncarbamate.

EXAMPLE 50

1-methyl-5-nitroimidazol-2-ylmethyl N-methoxycarbamate 2 g. of 1-methyl-5-nitroimidazol-2-ylmethyl N-hydroxycarbamate is dissolved in 100 ml. hot methanol. After cooling the solution is treated with an excess of an ether solution of diazomethane. At first, decolorization of the diazomethane is rapid, but later it is very low. After several hours, the colorless solution is filtered from starting material. The residue from the solution is chromatographed over a column of silica gel in ethyl acetate solution. The O-methyl derivative comes directly through the column and is non-crystalline. This material is treated with one equivalent weight of p-toluenesulfonic acid in methyl ethyl ketone to give the p-toluenesulfonic acid salt of 1-methyl-5-nitroimidazol-2-ylmethyl N-methoxycarbamate in 17% overall yield; M.P. 113–115° C.

In accordance with the above procedure, but starting with 1-methyl-5-nitroimidazol-2-ylmethyl N-methyl-N-hydroxycarbamate,
1-methyl-5-nitroimidazol-2-ylmethyl N-propyl-N-hydroxycarbamate,
1-methyl-5-nitroimidazol-2-ylmethyl N-phenyl-N-hydroxycarbamate,
1-methyl-5-nitroimidazol-2-ylmethyl N-benzyl-N-hydroxycarbamate, in place of 1-methyl-5-nitroimidazol-2-ylmethyl N-hydroxycarbamate, there is obtained the corresponding 1-methyl-5-nitroimidazol-2-ylmethyl N-methyl-N-methoxycarbamate, 1-methyl-5-nitroimidazol-2-ylmethyl N-propyl-N-methoxycarbamate,
1-methyl-5-nitroimidazol-2-ylmethyl N-phenyl-N-methoxycarbamate,
1-methyl-5-nitroimidazol-2-ylmethyl N-benzyl-N-methoxycarbamate.

In accordance with the above procedure, but using diazoethane, diazopropane, diazobutane, and phenyldiazomethane, in place of diazomethane, there is obtained the corresponding 1-methyl-5-nitroimidazol-2-ylmethyl N-ethoxy carbamate,
1-methyl-5-nitroimidazol-2-ylmethyl N-propoxy carbamate,
1-methyl-5-nitroimidazol-2-ylmethyl N-butoxy carbamate, and
1-methyl-5-nitroimidazol-2-ylmethyl N-benzyloxycarbamate.

EXAMPLE 51

1-methyl-5-nitroimidazol-2-ylmethyl acetoxycarbamate

To a solution of 2.22 g. (0.01 mole) of 1-methyl-5-nitroimidazol-2-ylmethyl hydroxycarbamate in 10 ml. of pyridine, cooled in an ice bath, is added slowly 1.12 g. acetic anhydride. The mixture is allowed to warm to room temperature. The solvent is evaporated at reduced pressure leaving a residue which is slurried in ether and filtered giving 1-methyl-5-nitroimidazol-2-ylmethyl acetoxycarbamate.

In accordance with the above procedure, but starting with propionic anhydride, butyric anhydride, valeric anhydride or phenylacetic anhydride, in place of acetic anhydride, there is obtained the corresponding 1-methyl-5-nitroimidazol-2-ylmethyl N-propionoxycarbamate,
1-methyl-5-nitroimidazol-2-ylmethyl N-butyroxycarbamate,
1-methyl-5-nitroimidazol-2-ylmethyl N-valeroxycarbamate, and
1-methyl-5-nitroimidazol-2-ylmethyl N-phenylacetoxycarbamate.

In accordance with the above procedure, but starting with trifluoroacetic anhydride, in place of acetic anhydride, there is obtained the corresponding 1-methyl-5-nitroimidazol-2-ylmethyl N-trifluoroacetoxycarbamate.

EXAMPLE 52

1-methyl-5-nitroimidazol-2-ylmethyl N-benzoyloxycarbamate 1 g. of 1-methyl-5-nitroimidazol - 2 - ylmethyl hydroxycarbamate in 15 ml. of 1 N sodium hydroxide is stirred for 2 hours with 0.65 g. of benzoyl chloride. Benzoylation is repeated with 0.5 ml. of benzoyl chloride and additional sodium hydroxide. 25 ml. of benzene is added and the benzene layer separate, washed with water and dried over sodium sulfate. Evaporation yields 1-methyl-5-nitroimidazol - 2 - ylmethyl N - benzoyloxycarbamate; M.P. 147–151° C.

EXAMPLE 53

1-methyl-5-nitroimidazol-2-ylmethyl N-acetyl-N-acetoxy carbamate 0.22 g. (0.001 mole) of 1-methyl-5-nitroimidazol-2-ylmethyl hydroxycarbamate, 0.1 g. of potassium acetate and 5 ml. of acetic anhydride are heated on a steam bath for 3 hours. The reaction mixture is evaporated to dryness at reduced pressure and 5 ml. of water and 50 ml. of chloroform added to the residue. The chloroform extract on evaporation gives a crystalline product which is slurried in ether and filtered to yield 1-methyl-5-nitroimidazol-2-ylmethyl N-acetyl-N-acetoxycarbamate.

In accordance with the above procedure, but using propionic anhydride and potassium propionate, butyric anhydride and potassium butyrate, valeric anhydride and potassium valerate, phenylacetic anhydride and potassium phenyl acetate in place of acetic anhydride and potassium acetate, there is obtained the corresponding 1-methyl-5-nitroimidazol-2-ylmethyl N-propionyl-N-propionyloxycarbamate,
1-methyl-5-nitroimidazol-2-ylmethyl N-butyryl-N-butyryloxycarbamate,
1-methyl-5-nitroimidazol-2-ylmethyl N-valeryl-N-valeryloxycarbamate, and
1-methyl-5-nitroimidazol-2-ylmethyl N-phenylacetyl-N-phenylacetoxycarbamate.

What is claimed is:

1. A solid poultry feed composition comprising an orally ingestible solid poultry feed carrier containing a parasiticidally effective amount of the chemical compound having the formula:

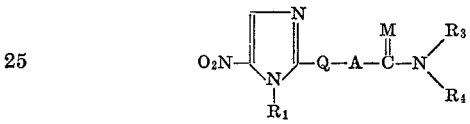

wherein Q is lower alkylene or lower alkylidene; A and M are each oxygen or sulfur; $R_1$ is lower alkyl or substituted lower alkyl wherein said substituent is lower alkenyl, hydroxy, loweralkanoyloxy, loweralkoxy, phenyl loweralkoxy, loweralkylthio, phenyl loweralkylthio, loweralkylamino, or loweralkyl sulfonyl; and $R_3$ and $R_4$ are independently each hydrogen, lower alkyl, halolower alkyl, hydroxy, hydroxy loweralkyl, amino, loweralkanoyl, haloloweralkanoyl, loweralkoxy, or benzoyloxy; or $R_3$ and $R_4$ together are morpholino, thiamorpholino, piperidino, 4-methyl piperazino, or pyrrolidino.

2. The composition of claim 1 in which the chemical compound is:

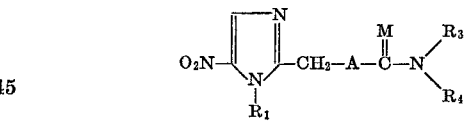

wherein $R_1$ is lower alkyl; A and M are each oxygen or sulfur; and $R_3$ and $R_4$ are each lower alkyl, hydroxy, or hydroxyloweralkyl.

3. The composition of claim 2 in which the chemical compound is 1-methyl-5-nitroimidazol - 2 - ylmethyl carbamate.

4. The composition of claim 2 in which the chemical compound is 1-ethyl-5-nitroimidazol - 2 - ylmethyl carbamate.

5. The composition of claim 2 in which the chemical compound is 1-methyl-5-nitroimidazol - 2 - ylmethyl hydroxy carbamate.

6. The composition of claim 1 in which the parasticidally effective amount is 0.003% to 0.1% by weight, based on the amount of the finished feed.

References Cited

UNITED STATES PATENTS 3,318,889   5/1967   Bywater et al. _____ 424—273

SAM ROSEN, Primary Examiner

U.S. Cl. X.R.
424—246, 248, 263, 267